US008268946B2

(12) United States Patent
Scott et al.

(10) Patent No.: US 8,268,946 B2
(45) Date of Patent: Sep. 18, 2012

(54) CLAY ACTIVATION OF PD(II) AND NI(II) COMPLEXES

(75) Inventors: Susannah L. Scott, Goleta, CA (US); Mabel A. Caipa Campos, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 509 days.

(21) Appl. No.: 12/488,100

(22) Filed: Jun. 19, 2009

(65) Prior Publication Data
US 2009/0326174 A1 Dec. 31, 2009

Related U.S. Application Data

(60) Provisional application No. 61/132,479, filed on Jun. 19, 2008.

(51) Int. Cl.
C08F 4/26 (2006.01)
C08F 4/80 (2006.01)
B01J 21/16 (2006.01)
B01J 31/28 (2006.01)

(52) U.S. Cl. ............... 526/172; 526/161; 526/169.1; 526/130; 526/126; 502/74; 502/60

(58) Field of Classification Search ............ 526/172, 526/161, 130, 169.1
See application file for complete search history.

(56) References Cited

U.S. PATENT DOCUMENTS

| 4,716,138 | A  | * | 12/1987 | Murray ............ 502/117 |
| 6,451,728 | B1 |   | 9/2002  | Matsui et al. |
| 7,754,789 | B1 | * | 7/2010  | Scott et al. ........... 523/351 |
| 7,772,299 | B2 | * | 8/2010  | Scott et al. ........... 523/351 |
| 7,776,943 | B2 | * | 8/2010  | Scott et al. ........... 523/351 |
| 2007/0049712 | A1 | * | 3/2007 | Allen et al. ........... 526/171 |
| 2007/0185343 | A1 |   | 8/2007  | Verpoort et al. |

FOREIGN PATENT DOCUMENTS

| CA | 2556356 | | 2/2007 |
| EP | 296687 | B1 | 2/1994 |
| EP | 589527 | B1 | 7/1997 |
| EP | 1760086 | | 3/2007 |
| EP | 1760097 | | 3/2007 |
| EP | 1762572 | | 3/2007 |
| WO | WO 00/06615 | A1 * | 2/2000 |
| WO | WO 0006615 | | 2/2000 |

OTHER PUBLICATIONS

Nowack et al., Z. Anorg. Allg. Chem., 2005, 631, 2775-2781.*
Kochi et al., Dalton Trans., 2006, 25-27.*
L. S. Boffa, B. M. Novak, Chem. Rev. 2000, 100, 1479-1493.
J. Zhang, X. Wang, G. X. Jin, Coord. Chem. Rev. 2006, 250, 95-109.
H. G. Alt, A. Koppl, Chem. Rev. 2000, 100, 1205-1221.
L. K. Johnson, C. M. Killian, M. Brookhart, J. Am. Chem. Soc. 1995, 117, 6414-6415.
S. D. Ittel, L. K. Johnson, M. Brookhart, Chem. Rev. 2000, 100, 1169-1203.
L. K. Johnson, S. Mecking, M. Brookhart, J. Am. Chem. Soc. 1996, 118, 267-268.
S. Mecking, Coord. Chem. Rev. 2000, 203, 325-351.
S. Mecking, L. K. Johnson, L. Wang, M. Brookhart, J. Am. Chem. Soc. 1998, 120, 888-899.
E. Drent, R. van Dijk, R. van Ginkel, B. van Oort, R. I. Pugh, Chem. Commun. 2002, 744-745.
A. Haras, G. D. W. Anderson, A. Michalak, B. Rieger, T. Ziegler, Organometallics 2006, 25, 4491-4497.
M. J. Szabo, N. M. Galea, A. Michalak, S. Y. Yang, L. F. Groux, W. E. Piers, T. Ziegler, J. Am. Chem. Soc. 2005, 127, 14692-14703.
S. Tomasi, H. Weiss, T. Ziegler, Organometallics 2006, 25, 3619-3630.
M. J. Szabo, R. F. Jordan, A. Michalak, W. E. Piers, T. Weiss, S. Y. Yang, T. Ziegler, Organometallics 2004, 23, 5565-5572.
A. K. Hearley, R. A. J. Nowack, B. Rieger, Organometallics 2005, 24, 2755-2763.
T. Kochi, K. Yoshimura, K. Nozaki, Dalton Trans. 2006, 25-27.
D. K. Newsham, S. Borkar, A. Sen, D. M. Conner, B. L. Goodall, Organometallics 2007, 26, 3636-3638.
T. Kochi, A. Nakamura, H. Ida, K. Nozaki, J. Am. Chem. Soc. 2007, 129, 7770-7771.
K. M. Skupov, P. R. Marella, J. L. Hobbs, L. H. McIntosh, B. L. Goodall, J. P. Claverie, Macromolecules 2006, 39, 4279-4281.
S. Liu, S. Borkar, D. Newsham, H. Yennawar, A. Sen, Organometallics 2007, 26, 210-216.
T. Kochi, S. Noda, K. Yoshimura, K. Nozaki, J. Am. Chem. Soc. 2007, 129, 8948-8949.
S. Luo, J. Vela, G. R. Lief, R. F. Jordan, J. Am. Chem. Soc. 2007, 129, 8946-8947.
W. Weng, Z. Shen, R. F. Jordan, J. Am. Chem. Soc. 2007, 129, 15450-15451.
J. Vela, G. R. Lief, Z. L. Shen, R. F. Jordan, Organometallics 2007, 26, 6624-6635.
W. Keim, F. H. Kowaldt, R. Goddard, C. Kruger, Angew. Chem., Int. Ed. Engl. 1978, 17, 466-467.
U. Klabunde, S. D. Ittel, J. Mol. Catal. 1987, 41, 123-134.
T. R. Younkin, E. F. Conner, J. I. Henderson, S. K. Friedrich, R. H. Grubbs, D. A. Bansleben, Science 2000, 287, 460-462.
C. Carlini, M. Martinelli, A. M. R. Galletti, G. Sbrana, Macromol. Chem. Phys. 2002, 203, 1606-1613.
V. C. Gibson, A. Tomov, Chem. Commun. 2001, 1964-1965.
R. J. Nowack, A. K. Hearley, B. Rieger, Z. Anorg. Allg. Chem. 2005, 631, 2775-2781.
C. M. Reisinger, R. A. J. Nowack, D. Volkmer, B. Rieger, Dalton Trans. 2007, 272-278.
T. Schultz, A. Pfaltz, Synthesis 2005, 1005-1011.
E. Drent, R. van Dijk, R. van Ginkel, B. van Oort, R. I. Pugh, Chem. Commun. 2002, 964-965.

* cited by examiner

Primary Examiner — Rip A. Lee

(74) Attorney, Agent, or Firm — Berliner & Associates

(57) ABSTRACT

A clay-supported complex that includes a metal complex containing a phosphinobenzenesulfonate ligand coordinated to Pd(II) or Ni(II), and a clay combined with the metal complex. The metal complex can be neutral or charged. The clay-supported complex is active in the homopolymerization and copolymerization of olefins, including polarized and non-polarized alpha-olefins.

27 Claims, 16 Drawing Sheets

Table 1. Effect of LiMMT on the ethylene homopolymerization activity of 2a-d

| entry | catalyst | time (h) | PE yield (g) | activity (g mmol$^{-1}$h$^{-1}$) | $T_m$ ($\Delta H$) °C (J/g) | $M_n$, $M_w$ |
|---|---|---|---|---|---|---|
| 1 | 2a | 1.5 | 0.46 | 31 | 130.5 (261) | 8 700, 10 000 |
| 2 | 2a/LiMMT | 1.5 | 1.12 | 74 | 128.6 (216) | 6 300, 12 800 |
| 3 | 2a | 0.16 | 0.057 | 35 | 128.2 (285) | 3 800, 6 900 |
| 4 | 2a/LiMMT | 0.16 | 0.35 | 218 | 128.0 (135) | 6 800, 13 300 |
| 5 | 2b | 1.5 | 0.83 | 55 | 130.6 (261) | 5 887, 12 862 |
| 6 | 2b/LiMMT | 1.5 | 1.12 | 74 | 127.2 (145) | 4 538, 11 608 |
| 7 | 2b | 0.16 | 0.042 | 26 | 128.9 (128) | 5 657, 11 932 |
| 8 | 2b/LiMMT | 0.16 | 0.22 | 135 | 129.2 (116) | 5 046, 12 626 |
| 9 | 2c | 1.5 | 5.62 | 375 | 130.6 (261) | 8 642, 10 014 |
| 10 | 2c/LiMMT | 1.5 | 2.19 | 146 | 125.0 (209) | 7 137, 11 938 |
| 11 | 2c | 0.16 | 0.90 | 562 | 130.2 (270) | 8 864, 10 860 |
| 12 | 2c/LiMMT | 0.16 | 1.03 | 129 | 122.5 (132) | 4 088, 10 166 |
| 13 | 2d | 1.5 | 14.0 | 933 | 127.5 (222) | 10273, 21103 |
| 14 | 2d/LiMMT | 1.5 | 3.13 | 208 | 127.6 (211) | 13224, 20343 |
| 15 | 2d | 0.16 | 0.52 | 66 | 127.3 (216) | 6144, 11829 |
| 16 | 2d/LiMMT | 0.16 | 2.23 | 279 | 125.4 (195) | 11306, 19805 |

Conditions: Pd (0.010 mmol), LiMMT (120 mg), 90 °C, 100 psi ethylene on demand, 80 mL (toluene).

FIG. 2

Table 2. Effect of clay pretreatment and clay loading, on the ethylene polymerization activity of clay-supported 2a

| entry | catalyst | time (h) | PE yield (g) | activity (g mmol$^{-1}$ h$^{-1}$) | $T_m$ ($\Delta H$) °C (J/g) | $M_n$, $M_w$ |
|---|---|---|---|---|---|---|
| 1 | 2a | 1.5 | 0.46 | 31 | 130.5 (261) | 8 700, 10 000 |
| 2 | 2a/LiMMT | 1.5 | 1.12 | 74 | 128.6 (216) | 6 300, 12 800 |
| 17 | 2a/LiMMT/TIBA | 1.5 | 1.40 | 93 | 130.4 (230) | 6 400, 16 100 |
| 18 | 2a/MMT | 1.5 | 1.54 | 102 | 131.2 (268) | 6 500, 13 300 |
| 19* | 2a/MMT | 1.5 | 2.10 | 140 | 131.0 (243) | 5 200, 11 900 |

Conditions: Pd (0.010 mmol), MMT (120 mg), TIBA (1.6 M in hexanes, 96 mg), 90 °C, 100 psi ethylene on demand, 80 mL (toluene). *MMT (240 mg).

FIG. 3

Table 3. Ligand effect on the ethylene homopolymerization activities of 2a and 2c

| entry | catalyst | time (h) | PE yield (g) | activity (g mmol$^{-1}$ h$^{-1}$) | $T_m$ ($\Delta H$) °C (J/g) | $M_n$, $M_w$ |
|---|---|---|---|---|---|---|
| 1 | 2a | 1.5 | 0.46 | 31 | 130.5 (261) | 8 700, 10 000 |
| 3 | 2a | 0.16 | 0.057 | 35 | 128.2 (285) | 3 842, 6 900 |
| 17 | 2a/LiMMT/TIBA | 1.5 | 1.40 | 93 | 130.4 (230) | 6 406, 16 100 |
| 9 | 2c | 1.5 | 5.62 | 375 | 130.6 (261) | 8 600, 10 000 |
| 11 | 2c | 0.16 | 0.90 | 562 | 123.4 (58) | 8 900, 10 900 |
| 20 | 2c/LiMMT/TIBA | 1.5 | 3.60 | 240 | 128.6 (217) | 6 300, 12 800 |
| 21 | 2c/LiMMT/TIBA | 0.16 | 1.30 | 812 | 129.8 (252) | 5 700, 11 400 |

Conditions: Pd (0.010 mmol), LiMMT (120 mg), TIBA (1.6 M in hexanes, 96 mg), 90 °C, 100 psi ethylene on demand, 80 mL (toluene).

FIG. 4

Table 4. Activity of Pd complexes in copolymerization of ethylene and methyl acrylate

| entry | catalyst | yield (g) | activity (g mmol$^{-1}$h$^{-1}$) |
|---|---|---|---|
| 22 | 2b | 16.2 | 108 |
| 23 | 2b/LiMMT | 14.6 | 97 |
| 24 | 2d | 36.5 | 243 |
| 25 | 2d/LiMMT | 8.6 | 57 |
| 26 | 2a | - | very low activity reported* |
| 27 | 2a/LiMMT | 6.5 | 43 |
| 28 | 2c | - | no activity reported |
| 29 | 2c/LiMMT | 22.0 | 147 |
| 30 | 2b/MMT | 11.8 | 79 |

Conditions: Pd (0.10 g, 0.15 mmol), clay (1.0 g), methyl acrylate (12 mL), 100 °C, 3 MPa (428 psi) ethylene on demand, 480 mL toluene. Reaction time: 1 h. *Nozaki et al., Dalton Trans. 2006, 25-27.

FIG. 5

Table 5. Activity of Pd complexes in copolymerization of ethylene and ethyl acrylate

| entry | catalyst | yield (g) | activity (g mmol$^{-1}$h$^{-1}$) |
|---|---|---|---|
| 31 | 2a | 3.18 | 64 |
| 32 | 2a/LiMMT | 1.0 | 20 |
| 33 | 2b | 6.77 | 135 |
| 34 | 2b/LiMMT | 1.82 | 36 |
| 35 | 2c | 13.8 | 276 |
| 36 | 2c/LiMMT | 8.42 | 168 |
| 37 | 2d | 10.5 | 210 |
| 38 | 2d/LiMMT | 1.43 | 29 |

Conditions: Pd (0.030 g, 0.05 mmol), clay (0.30 g), ethyl acrylate (3.7 mL), 100 °C, 430 psi ethylene on demand, 110 mL toluene. Reaction time: 1 h.

FIG. 6

Table 6. Characterization of ethylene-methyl acrylate copolymers

| entry | catalyst | ν(C=O) (cm$^{-1}$) | $T_m$ (ΔH) °C (J/g) | $M_n$, $M_w$ |
|---|---|---|---|---|
| 22 | 2b | 1738 | 118.2 (181) | 8 200, 14 900 |
| 23 | 2b/LiMMT | 1739 | 116.0, 118.3 (155) | 9 600, 15 700 |
| 24 | 2d | 1740 | 118.9 (171) | 6 000, 12 800 |
| 25 | 2d/LiMMT | 1740 | 115.0, 119.5 (157) | 9 900, 15 500 |
| 26 | 2a/LiMMT | 1743 | 118.0, 120.1 (157) | 6 500, 11 900 |
| 29 | 2c/LiMMT | 1740 | 117.8, 119.8 (162) | 4 600, 10 100 |
| 30 | 2b/MMT | 1745 | 118.0, 119.2 (163) | 8 100, 15 900 |

Conditions: Pd (0.10 g, 0.15 mmol), clay (1.0 g), methyl acrylate (12 mL), 100 °C, 3 MPa (428 psi) ethylene on demand, 480 mL toluene. Reaction time: 1 h.

FIG. 10

Table 7. Characterization of ethylene-ethyl acrylate copolymers

| entry | catalyst | ν(C=O) (cm$^{-1}$) | $T_m$ (ΔH) °C (J/g) | $M_n$, $M_w$ |
|---|---|---|---|---|
| 31 | 2a | 1740 | 120.6 (156) | 6 646, 14 680 |
| 32 | 2a/LiMMT | 1742 | 123.6 (114) | 6 845, 10 589 |
| 33 | 2b | 1747 | 120.3 (216) | 3 107, 6 534 |
| 34 | 2b/LiMMT | 1741 | 125.1 (110) | very low $M_w$ |
| 35 | 2c | 1743 | 121.7 (184) | 6 373, 11 391 |
| 36 | 2c/LiMMT | 1741 | 120.0 (151) | 5 332, 10 563 |
| 37 | 2d | 1743 | 120.9 (181) | 8 008, 13 424 |
| 38 | 2d/LiMMT | 1747 | 124.1 (136) | 5 951, 9 693 |

Conditions: Pd (30.0 mg, 0.05 mmol), clay (0.30 g), ethyl acrylate (3.7 mL), 100 °C, 430 psi ethylene on demand, 110 mL toluene. Reaction time: 1 h.

FIG. 11

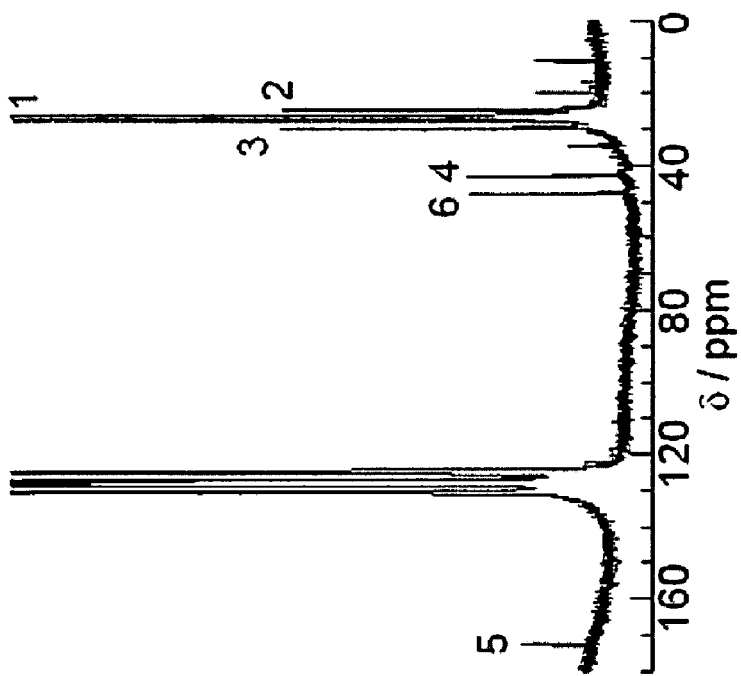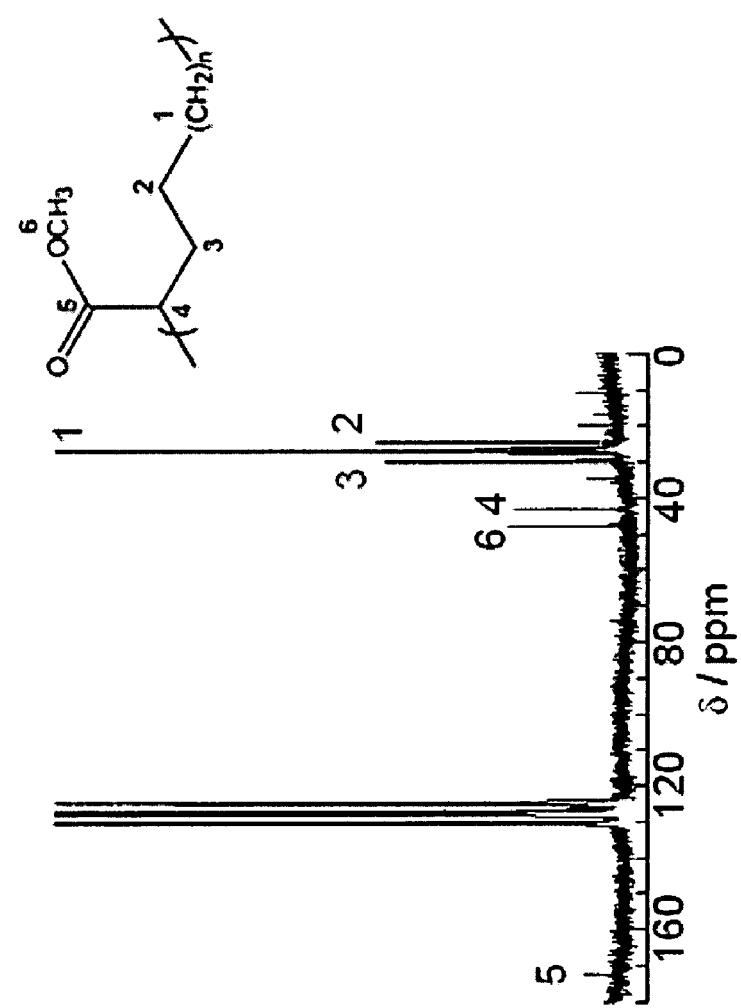
FIG. 13

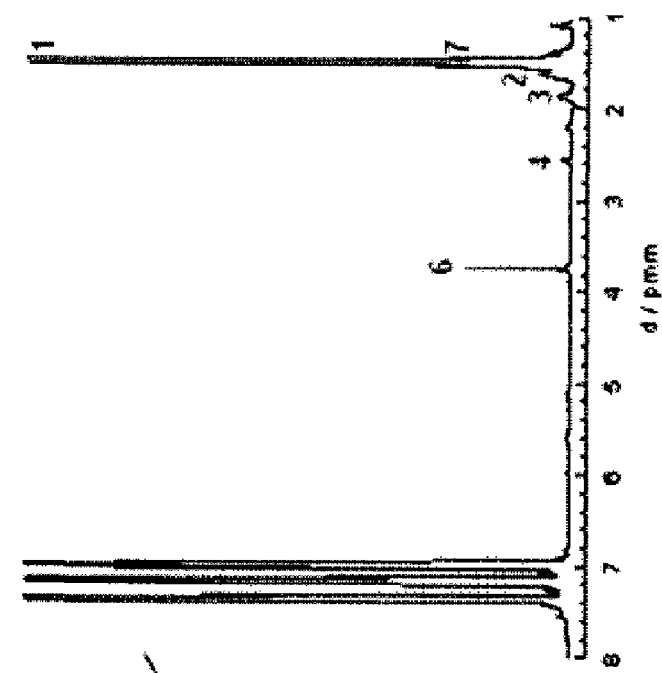
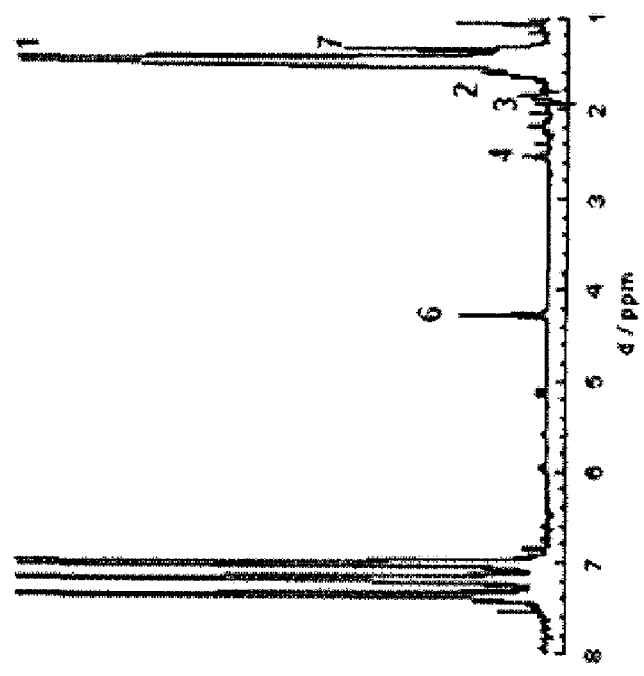
FIG. 14

Table 8. Copolymerization of ethylene and methyl acrylate, catalyzed by 3a

| entry | catalyst | time (h) | yield (g) | activity (g mmol⁻¹ h⁻¹) | ν(C=O) (cm⁻¹) | $T_m$ (ΔH) °C (J/g) | $M_n, M_w$ |
|---|---|---|---|---|---|---|---|
| 39 | 3a | 1 | 0 | 0 | - | - | 0 |
| 40 | 3a/LiMMT/TIBA | 1 | 0.24 | 4.80 | 1740 | 118.9 (156) | - |
| 41 | 3a/LiMMT/TIBA | 5.5 | 2.36 | 8.58 | 1740 | 119.2 (148) | 5 481, 10 264 |

Conditions: Ni (0.30 g, 0.05 mmol), LiMMT (300 mg), TIBA (240 mg), methyl acrylate (3.8 mL), 100 °C, 430 psi ethylene on demand, 110 mL toluene.

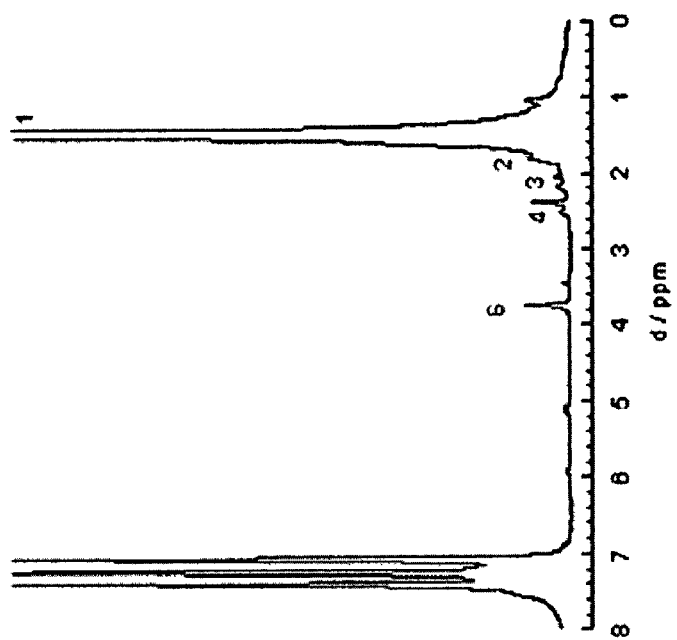
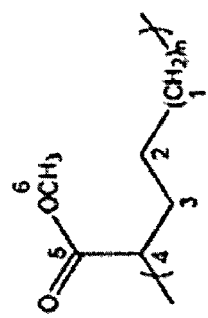
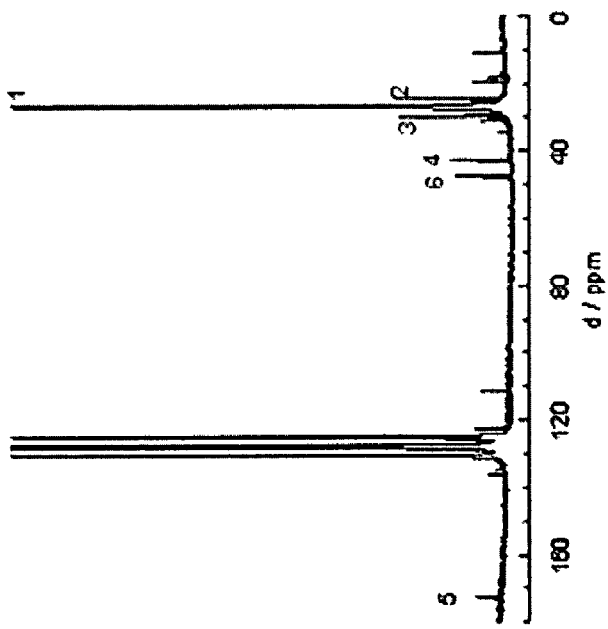
FIG. 18

CLAY ACTIVATION OF PD(II) AND NI(II) COMPLEXES

CROSS-REFERENCE TO RELATED APPLICATIONS

This application claims the benefit of Provisional Patent Application No. 61/132,479, filed Jun. 19, 2008, which is incorporated by reference herein.

BACKGROUND

1. Field of the Invention

This invention broadly relates to supported catalysts for olefin polymerization and copolymerization.

2. Related Art

The art has sought to improve important material properties such as toughness, adhesion, surface properties (paintability and printability), solvent resistance, miscibility with other polymers, and rheological properties (1). Early transition metal Ziegler-Natta and metallocene type complexes are used extensively for the homopolymerization of α-olefins (2,3). The high oxophilicity of complexes based on Ti, Zr, and Cr causes them to be most poisoned by functionalized vinyl monomers, particularly commercially-available polar monomers such as acrylates, methacrylates, and vinyl acetate (1).

The development of olefin polymerization catalysts that are compatible with polar functionalized monomers is far from trivial, due to the strong interaction between polar monomers and catalysts, causing inhibition. A major advance was achieved by Brookhart et al. (4), who were the first to demonstrate the insertion copolymerization of ethylene and methyl acrylate (MA) using cationic Ni(II) and Pd(II) diimine complexes. The resultant polymer is branched with the acrylate units located only at the end of the branches (5-8). More recently, the random incorporation of acrylate monomers into linear polyethylene was reported by Drent et al. (9), who described the use of an in situ catalyst prepared by reaction of bis(ortho-methoxyphenyl)phosphinobenzene-sulfonate ligand in combination with $Pd(dba)_2$ (dba=dibenzylideneacetone) with 2-17 mol % incorporation of acrylate monomers and relatively low molecular weights (Mn=2,000-20,000) (10,11). Theoretical studies suggest that the absence of 'chain-walking' by these catalysts is due to the increased barrier for β-hydride elimination relative to the Brookhart systems (12,13,14).

It has been proposed that appropriate electrophilicity of the metal center is required for copolymerization. Too high an electrophilicity results in undesired coordination of the polar functional group to the active site as a stable chelate, whereas too low an electrophilicity results in low reactivity for olefin insertion (15). Following the work of Pugh et al. (9), several groups have investigated the chemistry of Pd(II) phosphinobenzene-sulfonate systems and their performance in ethylene/acrylate and ethylene/CO copolymerization (16,17,18, 19,20,21,22,23). In addition, these systems have been found to catalyze other copolymerizations, including vinyl acetate/CO (24), ethylene/norbornene (25), ethylene/functionalized-norbornene (26), ethylene/acrylonitrile (27), and ethylene/vinyl ether copolymerization (28,29), to produce linear copolymers. Insertion of acrylonitrile units into a linear polyethylene chain was also achieved with the neutral lutidine-based Pd(II) complexes. The reaction is slow, but occurs in a catalytic fashion (27). It has been suggested that a weak intermittent interaction of the methoxy group with the metal center could promote displacement of the coordinated, Lewis basic comonomer (30,31).

Neutral oxygen-containing Ni chelates as catalysts were developed many years ago by Keim el al. for the Shell higher olefins process (SHOP) (32) in which [P,O]Ni-catalyzed ethene oligomerization showed high tolerance for functional groups (33). Grubbs et al., developed a family of [N,O]Ni catalysts based on salicylaldimine ligands capable of copolymerizing ethylene with functionalized norbornenes (34). These catalysts, however, do not incorporate polar monomers with the polar functionality directly attached to the C—C bond. Subsequently, Carlini et al. introduced nickel salicylaldiminate catalysts, formed in situ, which were claimed to copolymerize ethylene with methyl methacrylate (MMA), producing high molecular weight linear copolymers (35). However, the likely formation of a mixture of homopolymers was not investigated. Gibson et al., employed [P,O]Ni catalysts to produce low molecular weight methyl methacrylate-terminated polyethylene (36). Ni catalysts based on phosphinobenzenesulfonate ligands have been synthesized and characterized by Rieger et al., and although activity for ethylene homopolymerization was reported (even in the presence of polar monomers), no copolymerization activity was observed (37).

BRIEF SUMMARY

The development of an olefin polymerization catalyst compatible with readily available polar-functionalized monomers may offer a low-pressure and low-temperature route to a wide range of functionalized copolymers, which are presently produced by high pressure free-radical polymerizations. These free-radical processes require high pressures resulting in high capital investment and manufacturing costs, and incorporation of the polar functionality is uncontrolled.

In one aspect, then, a clay-supported complex is provided which can act to polymerize olefin monomers and comonomers. The clay-supported complex includes a metal complex that contains a phosphinobenzenesulfonate ligand coordinated to Pd(II) or Ni(II), and a clay combined with the metal complex. In some versions, the phosphinobenzenesulfonate ligand is coordinated to Pd(II), while in other versions the phosphinobenzenesulfonate ligand is coordinated to Ni(II). The metal complex can be derived from a metal compound of the formula (I) or (II) described below, and can include a phenyl group of the formula (III) described below. With any version of the metal complex, the clay can be a clay mineral or an ion exchange layered silicate, and can be montmorillonite, beidellite, nontronite, saponite, hectorite, stevensite, vermiculite, mica, illite, sericite, glauconite, attapulgite, sepiolite, tacniolite, palygorskite, bentonite, pyrophyllite, talc, a chlorite, and kaolinite.

In another aspect, a method of homopolymerization is provided. The method includes polymerizing an olefin monomer in the presence of any version of the clay-supported complex. The monomer can be: an olefin of the formula $R^1CH\!=\!CH_2$, where $R^1$ is hydrogen or a linear, branched or cyclic alkyl group having 1 to 30 carbon atoms; styrene; functionalized styrene, norbornene, or functionalized norbornene.

A method of copolymerization is also provided. The method includes polymerizing two or more different monomers in the presence of any version of the clay-supported catalyst complex. In some versions of the method, the two or more different monomers are each independently: an olefin of the formula $R^2CH\!=\!CH_2$, where $R^2$ is either hydrogen or a linear, branched or cyclic alkyl group having 1 to 30 carbon atoms; styrene; functionalized styrene, norbornene; functionalized norbornene; or a polar monomer of the formula $H_2C=CR^3X$, where $R^3$ is hydrogen or an alkyl, aryl, or alkoxy group having 1 to 30 carbon atoms, and X is a polar group.

In a further aspect, a clay-supported complex is provided that includes a metal complex comprising a phosphinobenzenephosphonate ligand coordinated to Pd(II) or Ni(II), and a clay combined with said metal complex. The phosphinobenzenephosphonate ligand can be prepared according to known methods, and the metal complex can be formed similar to the way metal complexes containing phosphinobenzenesulfonate-containing clay-complexes are formed. Methods of homopolymerization or copolymerization are also provided in which at least one monomer is polymerized in the presence of the clay-supported phosphinobenzenephosphonate-based complex.

In another aspect, a composite comprising a clay-supported complex and a product produced by homopolymerization using any of the clay-supported complexes is provided.

Also, a composite comprising a clay-supported complex and a product produced by copolymerization using any of the clay-supported complexes is provided.

BRIEF DESCRIPTION OF THE DRAWINGS

For a more complete understanding of the present invention, reference is now made to the following descriptions taken in conjunction with the accompanying drawing, in which:

FIG. 2 is a table showing the effect of clay (LiMMT) on homopolymerization;

FIG. 3 is a table showing the effect of clay on polymerization;

FIG. 4 is a table showing the effect of catalyst ligand on homopolymerization;

FIG. 5 is a table showing the activity of Pd complexes in copolymerization of ethylene and methyl acrylate;

FIG. 6 is a table showing the activity of Pd complexes in copolymerization of ethylene and ethyl acrylate;

FIG. 10 is a table characterizing ethylene-methyl acrylate copolymers;

FIG. 11 is a table characterizing ethylene-ethyl acrylate copolymers;

FIG. 13 is a comparison of $^{13}$C NMR spectra of ethylene-methyl acrylate copolymers produced by homogeneous catalyst 2d (13A); and clay-supported 2d (13B);

FIG. 14 is a comparison of $^1$H NMR spectra for ethylene-ethyl acrylate copolymers produced by homogeneous 2c (14A); and clay-supported 2c (14B);

FIG. 16 is a table showing copolymerization with catalyst 3a;

FIG. 17 is an IR spectrum of ethylene-methyl acrylate copolymer produced by clay-supported nickel catalyst 3a;

FIG. 18 provides $^{13}$C (18A) and $^1$H NMR (18B) spectra of ethylene-methyl acrylate copolymer produced with clay-supported 3a;

DETAILED DESCRIPTION

Figure 1:
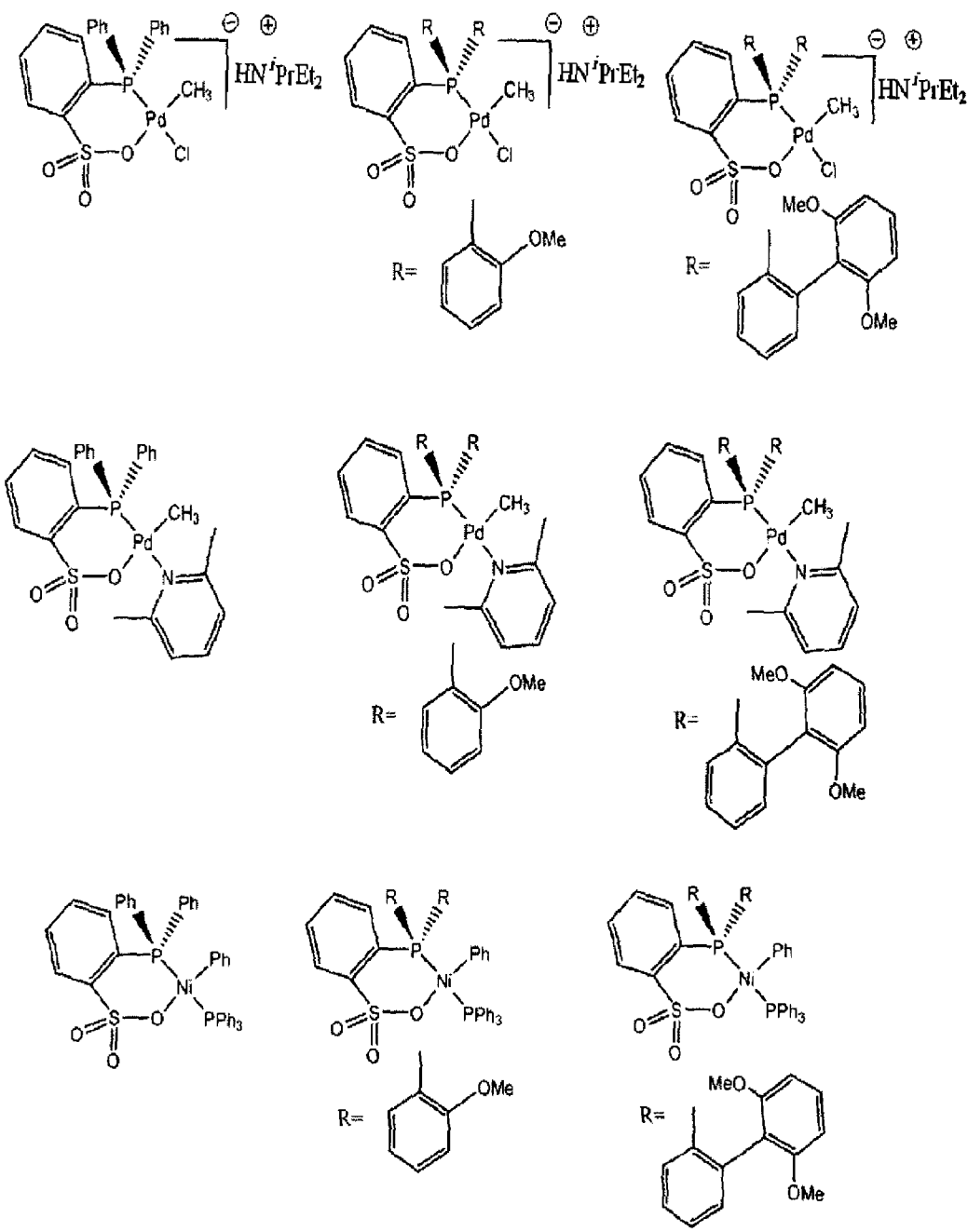
FIG. 1 is a list of metal compounds.
Figure 7:
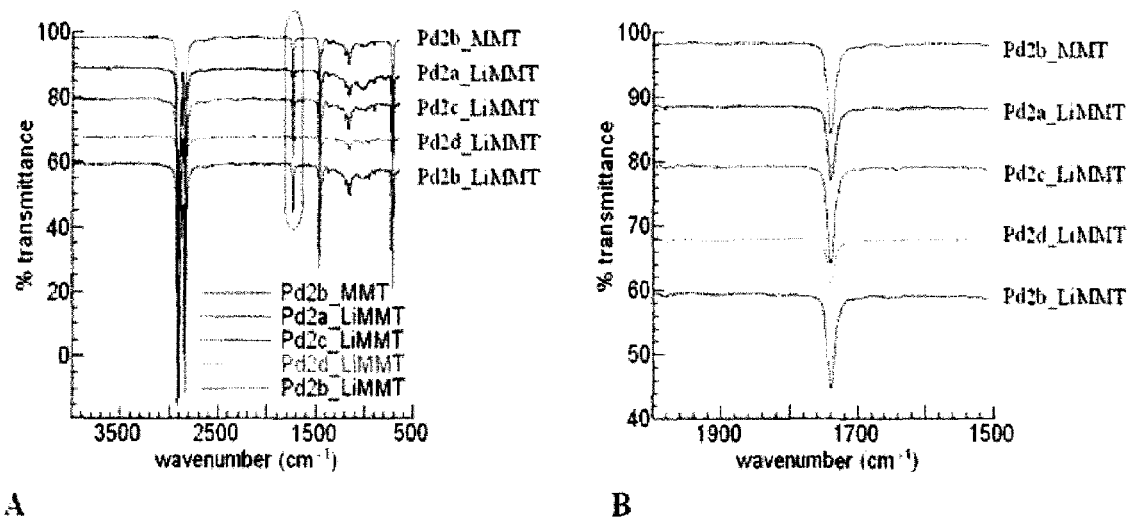
FIG. 7 provides FTIR spectra (offset) of the ethylene-methyl acrylate copolymers produced by clay-supported catalysts 2a-d (7A), with an expanded region showing the ester vibration (713)
Figure 8:
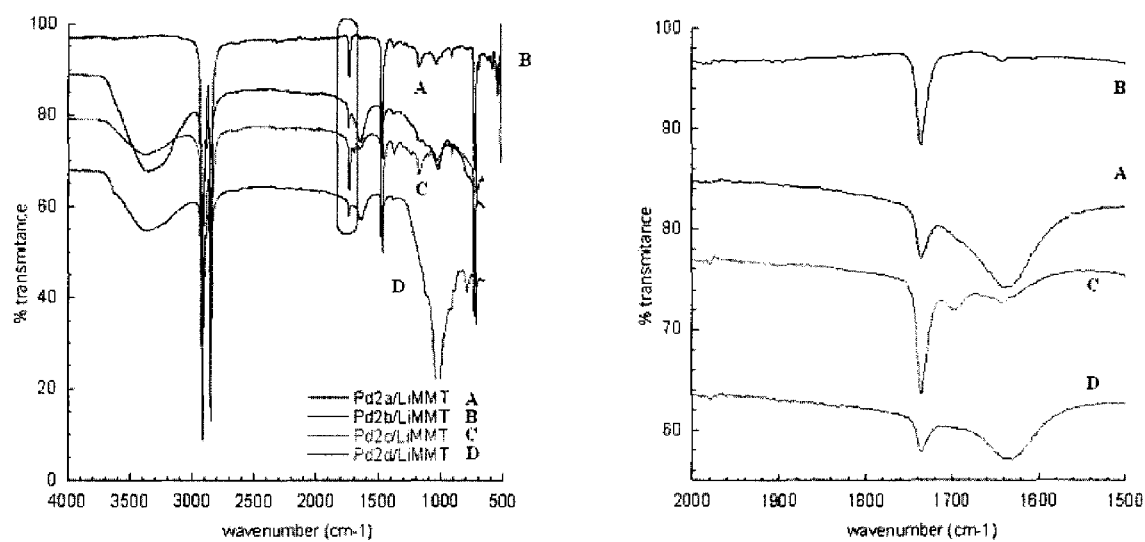
FIG. 8 provides FTIR spectra (offset) of the ethylene-ethyl acrylate copolymers produced by clay-supported catalysts 2a-d (8A), with an expanded region showing the ester vibration (8B)

In one aspect, clay-supported Pd(II) and Ni(II) complexes are provided, based on a phosphinobenzenesulfonate ligand, that are more active in polymerization than their homogeneous (non-supported) analogues. Various embodiments of clay-supported Pd(II) complexes, as well as clay-supported Ni(II) complexes, also tolerate polar monomers, allowing the incorporation of an acrylate, for example, into the polymer. In one embodiment, a method for homopolymerization using a clay-supported Pd(II) complex is provided. In another embodiment, a method for copolymerization with an acrylate using a clay-supported Pd(II) complex or Ni(II) complex is provided. In a particular embodiment, the clay supporting the complex is montmorillonite clay. In another particular embodiment, the polymer precursor is ethylene. In a further embodiment, methyl acrylate is used with ethylene for copolymerization. In place of montmorillonite clay, any of the layered materials in U.S. patent application Ser. No. 11/451,199, Method for Forming Exfoliated Clay-polyolefin Nanocomposites, filed Jun. 12, 2006, the disclosures in which are hereby incorporated by reference, can be used. In place of ethylene as the polymer precursor, in certain embodiments, propylene, 1-hexene or styrene can be used. In place of methyl or ethyl acrylate, in certain embodiments, butyl acrylate, methyl methacrylate, vinyl acetate, vinyl cyanide or acrylonitrile can be used.

A clay-supported complex in accordance with the present invention includes a metal complex that contains a phosphinobenzenesulfonate ligand coordinated to Pd(II) or Ni(II). In some embodiments, the metal complex is derived from, or formed by combining a clay with, a metal compound of the following formula (I) or (II):

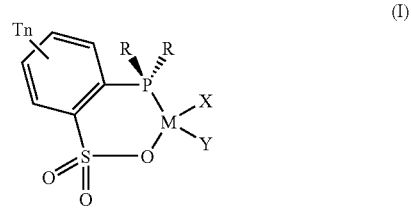

(I)

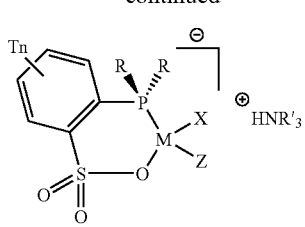

(II)

In these formulas:

M is Pd or Ni;

each T of $T_n$, independently of any other T, is a hydrogen atom, a halogen atom, an oxygen atom, a nitrogen atom, a phosphorus atom, or a hydrocarbyl group having 1 to 30 carbon atoms, wherein the hydrocarbyl group may contain one or more silicon atoms, each T may be a ring, and n=0-4;

X is a hydrogen atom, a halogen atom, an oxygen atom, a nitrogen atom, a phosphorus atom, or a hydrocarbyl group having 1 to 30 carbon atoms, wherein the hydrocarbyl group may contain one or more silicon atoms, and wherein X may be a ring;

each R, independently of the other R, is a hydrogen atom, a halogen atom, an oxygen atom, a nitrogen atom, a phosphorus atom, a hydrocarbyl group having 1 to 30 carbon atoms, or an aryl group substituted with one or more functional groups and having 1 to 30 carbon atoms;

Y is a compound having 1 to 20 carbon atoms and containing one or more oxygen, nitrogen, phosphorus and/or sulfur atoms that coordinate to M;

Z is a hydrogen atom, a hydrocarbyl group having 1 to 20 carbon atoms, a halogen atom, or a trifluoromethanesulfonyl group; and each R', independently of any other R', is a hydrocarbyl group having 1 to 20 carbon atoms, an alkoxy group having 1 to 20 carbon atoms, or an aryloxy group having 1 to 20 carbon atoms, and may contain one or more oxygen atoms.

In certain embodiments, each R, independently of the other R, is a phenyl group of the formula (III):

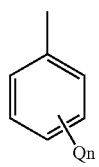

(III)

which may contain one or more substituents Q. In these embodiments, each Q of Qn, independently of any other Q, is a hydrogen atom, a halogen atom, an oxygen atom, a sulfur atom, a nitrogen atom, a phosphorus atom, a hydrocarbyl group having 1 to 24 carbon atoms, an alkoxy group having 1 to 24 carbon atoms, an aryloxy group having 1 to 24 carbon atoms, or a substituted aryl group having 1 to 24 carbon atoms, wherein the hydrocarbyl, alkoxy, aryloxy or substituted aryl group may contain one or more silicon atoms or alkoxy groups, or a combination thereof, and wherein n=0-5. In some embodiments, one or both R groups contain one or two substituents containing oxygen atoms at the ortho position. In particular embodiments, one or both R groups are a 2-methoxyphenyl group, or a 2-(2',6'-dimethoxyphenyl)phenyl group.

The phosphinobenzenesulfonate ligand in some embodiments of the formula (I) or (II) is coordinated to Pd(II), while in other embodiments the phosphinobenzenesulfonate ligand is coordinated to Ni(II). In any of these embodiments, both R groups can be the same.

In some embodiments of the formula (I) or (II), X is a hydrocarbyl group having one to six carbon atoms, and can be a methyl group or a phenyl group. In some embodiments of the formula (I) or (II), Z is a halogen atom. In some embodiments of formula (I) or (II), Y is a substituted pyridyl group or a triphenylphosphine ($PPh_3$) group. The term "substituted" in reference to the pyridyl group or other hydrocarbyl group refers to a pyridyl or hydrocarbyl group in which at least one hydrogen atom bound to a carbon atom is replaced by a bond to a non-hydrogen atom of a substituent group. Examples of non-hydrogen atoms include, but are not limited to, carbon, oxygen, nitrogen, phosphorus, sulfur, selenium, arsenic, chlorine, bromine, silicone and fluoride. Examples of substituent groups include halo, perhaloalkyl such as trifluoromethyl, hydroxy, amino, alkoxy, aryloxy, carboxy, mercapto, cyano, nitro, ester, ether, thioether, trialkylsilyl, amide and hydrocarbyl groups.

The metal compound in particular embodiments of the clay-supported complex can be selected from the group consisting of the complexes shown in FIG. 1.

In accordance with various embodiments, a clay is combined with the Pd(II) or Ni(II) metal complex. The term "clay" includes clay minerals and ion-exchange layered silicates. An ion-exchange layered silicate is a silicate compound having a crystal structure, where surfaces formed by largely covalent bonds are laminated in parallel, and contained interlayer cations are exchangeable. Most natural ion exchange layered silicate is mainly produced as a main component of clay mineral, and impurities (quartz and the like) other than ion exchange layered components are contained in many cases.

The clay in any embodiment of the clay-supported complex can be an ion exchange layered silicate, can be natural or synthetic, and can be selected from montmorillonite, beidellite, nontronite, saponite, hectorite, stevensite, vermiculite, mica, illite, sericite, glauconite, attapulgite, sepiolite, tacniolite, palygorskite, bentonite, pyrophyllite, talc, a chlorite, or kaolinite. The chlorite can be clinochlore, chamosite, nimite or pennantite. In particular embodiments, the silicate can be montmorillonite, hectorite, mica, taeniolite, or bentonite. More particularly, the silicate can be montmorillonite as a main component.

The clay can be used as is without pretreatment in any embodiment. However, any embodiment can include clay that has been chemically treated with one or more chemical treatment agents, such as an acid, a salt or the like, before combination with the metal complex. The chemical treatment can provide various effects such as interlayer cation exchange of the ion exchange layered silicate, or passivation of the clay surface, depending on the chemical treatment agents used.

For example, acid treatment can elute a portion of an element, such as Al, Fe, or Mg, that is incorporated in a crystal structure, and can remove impurities at the clay surface. The acid can be an inorganic acid, which can be sulfuric acid, hydrochloric acid, nitric acid or the like. In particular embodiments, the acid is sulfuric acid.

Salt treatment can exchange a cation present between layers. The salt can be a compound in which the anion portion contains an inorganic Brønsted acid or a halogen, and the cation portion contains Li, Mg or Zn. In particular embodiments, the salt can be LiCl, $Li_2SO_4$, $MgCl_2$, $MgSO_4$, $ZnCl_2$, $ZnSO_4$ or $Zn(NO_3)_2$ In any embodiment, a chemical treatment agent can be used alone, or two or more agents can be used in combination.

In addition, the chemical treatment can be performed more than once, using for example the same chemical treatment agent a number of times, or different chemical treatment agents sequentially. Thus, acid-treated clay, salt-treated clay, or acid and salt-treated clay can be used in any embodiment.

Further, in any embodiment, the clay can be crushed, granulated and/or classified to control the clay shape, particle size and strength. Also, the clay can be dried before catalyst preparation. In addition, to passivate the clay surface, an alkyl metal compound, such as alkyl aluminum, can be added to the clay prior to catalyst deposition.

Catalysts can be prepared in a drybox under an inert (N2) atmosphere. The phosphinobenzenesulfonate ligands can be prepared by generally known methods. For example, the ligand 2-(bis(aryl)phosphino)benzene-2-sulfonic acid can be prepared as previously described (39, 40). Pd and Ni metal complexes can be synthesized according to published literature procedures (22,27,37). For example, a Pd(II) precursor complex (such as PdMeCl(cod)) or a Ni(II) precursor complex (such as trans-NiCl(Ph)(PPh$_3$)$_2$) can be mixed with a phosphinobenzenesulfonate ligand to give a Pd(II) or Ni(II) metal complex.

Clay-supported catalysts can be prepared immediately prior to polymerization, under N$_2$ in a glovebox. A solution of a metal compound can be added to a clay slurry at room temperature, or at a temperature in the range of about −50° C. to 150° C., about 0° C. to 100° C., about 5° C. to 60° C., or about −77° C. to 50° C. After stirring, the mixture is allowed to settle and the solution is then decanted. The solid is washed one or more times with a solvent. For polymerization reactions, the solid can be resuspended in a solvent and loaded into a reactor. In a particular example, a metal compound solution (8.0 mg, 0.010 mmol) in 5.0 g CH$_2$Cl$_2$ is added to a slurry of lithium-exchanged montmorillonite (LiMMT) (120 mg) in 5.0 g dry toluene at room temperature. After stirring for 5 minutes, the mixture is allowed to settled, the solution is decanted, and the solid is washed 5 times with dry toluene. The solid can be resuspended in toluene for polymerization.

Homopolymerization reactions can be carried out in a reactor, such as a 300 mL autoclave (Parr Instrument Co., Moline, Ill., USA), using a glass insert with a diameter approximately 4 mm smaller than the interior diameter of the reactor. Catalysts can be transferred to the polymerization reactor in a N$_2$-filled glovebox. A small amount of solvent such as toluene can be placed between the insert and the reactor wall to improve thermal contact. In a typical procedure, a slurry of a clay-supported metal complex is poured into the insert and toluene (40.0 g, for example) is added. The reactor is sealed, removed from the glovebox, then heated to 90° C. and charged with 100 psi ethylene. As will be apparent, different reactor temperatures and pressures can be used based on the particular reaction components involved. Depending on the particular reaction components, the homopolymerization reaction can occur at a temperature and pressure in the range of about 50° C. to 120° C. and about 50 psi to 500 psi, about 0° C. to 150° C. and about 1 psi to 1000 psi, about 15° C. to 130° C. and about 10 psi to 700 psi, or about 35° C. to 110° C. and about 50 psi to 500 psi. In certain embodiments, the reaction is carried out at about 90° C. and about 100 psi. A monomer such as ethylene is fed continuously for a prescribed or predetermined time, then the reactor is vented and allowed to cool to room temperature. The solid recovered from the reactor can be filtered and washed with a solvent such as methanol, then dried in vacuum before weighing. The polymer yield is calculated after subtracting the mass of clay. A similar procedure can be used for polymerization with homogeneous (non-supported) catalysts, with the clay being omitted and a suspension of the metal complex in toluene charged directly to the reactor.

As used herein, the term "homogeneous" refers to a catalyst that is not supported by clay. Comparing the polymerization process carried out in the presence of a clay-supported complex, which contains a catalyst, to the polymerization process carried out in the presence of the same catalyst in homogeneous form can demonstrate the effect of the clay support on the polymerization process. As used herein, a catalyst refers to any metal complex or metal compound, whether clay-supported or homogeneous, that is active in polymerization. For example, the metal compounds shown in FIG. 1, and the metal complexes prepared by combining the metal compounds with clay, are considered to be catalysts.

Copolymerization reactions can be carried out in a similar fashion in a reactor, such as a 300 mL or 1.0 L Parr autoclave. In a typical procedure for the 1.0 L reactor, toluene (480 mL) and a comonomer (for example, 12 mL of methyl acrylate) are first added to the reactor under N$_2$. A catalyst alone (0.10 g, 0.15 mmol, for example) or a clay-supported catalyst (0.10 g on 1.0 g clay, for example), suspended in toluene (for example, 6 mL), is injected into the autoclave using ethylene pressure through a burst valve. A similar procedure can be employed for the 300 mL reactor, but with the amounts of the components adjusted accordingly for the smaller reactor size, for example, toluene (100 mL), comonomer (methyl acrylate, 3.7 mL), catalyst (0.030 g, 0.050 mmol) or clay-supported catalyst (0.030 g on 300 mg clay). For either reactor, the catalyst can be injected into the reactor at 95° C. and 200 psi ethylene. The ethylene pressure is then increased to 430 psi while the exothermic reaction can cause the temperature to rise to 100° C., and ethylene is fed continuously for a prescribed or predetermined time. As will be apparent, different reactor temperatures and pressures can be used based on the particular reaction components involved. Depending on the particular reaction components, the copolymerization reaction can occur at a temperature and pressure in the range of about 50° C. to 150° C. at about 200 psi to 800 psi, about 0° C. to 150° C. and about 1 psi to 1000 psi, about 15° C. to 130° C. and about 10 psi to 700 psi, or about 35° C. to 110° C. and about 50 psi to 500 psi. In certain embodiments, the reaction is carried out at 100° C. and 428 psi. The synthesized polymer can be recovered from the reactor and stirred with a solvent such as acidified methanol (for 1 hour). The solid can be filtered and washed (for example, 5 times) with the solvent to remove traces of polar homopolymer that may have formed.

In various embodiments, the homopolymerization process can utilize an olefin of the formula $R^1CH=C_{1-2}$, where $R^1$ is either hydrogen or a linear, branched or cyclic alkyl group having 1 to 30 carbon atoms. In some embodiments, $R^1$ is an alkyl group having 1 to 20 carbon atoms. In particular embodiments, the monomer can be an alpha-olefin such as ethylene, propylene, 1-butene, 1-hexene, 1-octene, or an alpha-olefin having 10 to 16 carbon atoms. The monomer can also be styrene, functionalized styrene, vinyl cyclohexane, norbornene, or functionalized norbornene.

In the copolymerization process, each of the two or more different monomers can be an olefin of the formula $R^2CH=CH_2$, where $R^2$ is either hydrogen or a linear, branched or cyclic alkyl group having 1 to 30 carbon atoms. In some embodiments, $R^2$ is an alkyl group having 1 to 20 carbon atoms. In particular embodiments, each monomer can be an alpha-olefin such as ethylene, propylene, 1-butene, 1-hexene, 1-octene, or an alpha-olefin having 10 to 16 carbon atoms. Each monomer can also be styrene, functionalized styrene, vinyl cyclohexane, norbornene, or functionalized norbornene. In some embodiments, at least one of the monomers is a polar monomer of the formula $H_2C=CR^3X$, where $R^3$ is hydrogen or an alkyl, aryl, or alkoxy group having 1 to 30 carbon atoms, and X is a polar group. In particular embodiments, $R^3$ is an alkyl, aryl, or alkoxy group having 1 to 20 carbon atoms. Examples of X include: a halogen such as Cl, Br, or F; —CN; —$C_6H_5N$; —$CONR^4R^5$; —$OR^4$; —$COOR^4$; —$OCOR^4$; —$COR^4$; —$C_6H_5OR^4$; and/or —$C_6H_5NR^4R^5$; where $R^4$ and $R^5$ are each independently hydrogen or a $C_{1-30}$ alkyl, aralkyl or aryl group. In particular embodiments, at least one monomer can be a polar olefin such as an alkyl acrylate (for example, methyl acrylate, ethyl acrylate), methyl methacrylate, acrylonitrile, a vinyl halide (for example, vinyl chloride, vinyl fluoride), an alkyl vinyl ether, a functionalized norbornene (for example, norbornenyl alcohol, norbornenyl acetate), N-vinyl-pyrrolidinone, N-alkylacrylamide, vinyl ketone, vinyl acetate, vinyl cyanide, or a functionalized styrene.

A "functionalized" monomer contains a functional group, which can be halo, ester, keto (oxo), amino, imino, hydroxyl, carboxylic acid, phosphite, phosphonite, phosphine, phosphinite, thioether, amide, nitrile, or ether.

The homopolymerization process can be carried out with a non-polar or low polarity olefin monomer. Examples of low polarity olefin monomers include low polarity olefins of the formula $R^1CH=CH_2$, where $R^1$ is a linear, branched or cyclic alkyl group having 1 to 30 carbon atoms, which in some embodiments has 1 to 20 carbon atoms. Examples of non-polar olefin monomers include ethylene, propylene, 1-butene, 1-hexene, 1-octene, or an alpha-olefin having 10 to 16 carbon atoms, styrene, vinyl cyclohexane, and norbornene The copolymerization process can be carried out with any combination of non-polar olefin, low polarity olefin, and/or polar olefin, including any of the olefins, alpha-olefins and polar olefins described herein. For example, in some embodiments, a copolymerization reaction contains two non-polar olefins, or two low-polarity olefins, or one non-polar olefin and one low-polarity olefin, or one non-polar and one polar olefin, or one low polarity olefin and one polar olefin, or any combination of three or more monomers where the monomers are non-polar, low polarity and polar olefins. Thus, copolymerization reactions can involve 2, 3, or more than 3 of any of the monomers described herein. Examples of polar olefin monomers include olefins of the formula $H_2C=CR^3X$, where $R^3$ is hydrogen or an alkyl, aryl, or alkoxy group having 1 to 30 carbon atoms, and X is a polar group. In particular embodiments, $R^3$ is an alkyl, aryl, or alkoxy group having 1 to 20 carbon atoms. Examples of X include: a halogen such as Cl, Br, or F; —CN; —$C_6H_5N$; —$CONR^4R^5$; —$OR^4$; —$COOR^4$; —$OCOR^4$; —$COR^4$; —$C_6H_5OR^4$; and/or —$C_6H_5NR^4R^5$; where $R^4$ and $R^5$ are each independently hydrogen or a $C_{1-30}$ alkyl, aralkyl or aryl group. In particular embodiments, at least one monomer can be a polar olefin such as an alkyl acrylate (for example, methyl acrylate, ethyl acrylate), methyl methacrylate, acrylonitrile, a vinyl halide (for example, vinyl chloride, vinyl fluoride), an alkyl vinyl ether, a functionalized norbornene (for example, norbornenyl alcohol, norbornenyl acetate), N-vinyl-pyrrolidinone, N-alkylacrylamide, vinyl ketone, vinyl acetate, vinyl cyanide, or a functionalized styrene (for example, para-methoxystyrene).

In particular embodiments, at least one of the different monomers in the copolymerization process is an olefin of the formula $R^2CH=CH_2$, where $R^2$ is either hydrogen or a linear, branched or cyclic alkyl group having 1 to 30 carbon atoms. In some embodiments, $R^2$ is an alkyl group having 1 to 20 carbon atoms. In particular embodiments, the olefin can be an alpha-olefin such as ethylene, propylene, 1-butene, 1-hexene, 1-octene, or an alpha-olefin having 10 to 16 carbon atoms.

The olefin can also be styrene, functionalized styrene, vinyl cyclohexane, norbornene, or functionalized norbornene.

In various embodiments, the clay-supported Pd(II) or Ni(II) complex can produce better particle morphologies and higher bulk densities than the corresponding homogeneous catalyst. In some embodiments, the clay-supported Pd(II) or Ni(II) complex can be more active in polymerization than the corresponding homogeneous catalyst, can produce polymers of higher molecular weight than polymers produced by the corresponding homogeneous catalyst, and/or can produce polymers having greater crystallinity than polymers produced by the corresponding homogeneous catalyst. In some embodiments, the clay-supported Pd(II) or Ni(II) complex is active in polymerization while the corresponding homogeneous catalyst is not active in polymerization.

The present invention may be better understood by referring to the accompanying examples, which are intended for illustration purposes only and should not in any sense be construed as limiting the scope of the invention as defined in the claims appended hereto.

EXAMPLE 1

General Procedures

Catalysts were prepared in a drybox under an inert (N2) atmosphere. The ligand precursor 2-(bis(aryl)phosphino)benzene-2-sulfonic acids, and their Pd and Ni complexes were synthesized according to published literature procedures. Triisobutylaluminum (1.0 M in hexanes, Aldrich) was used as received.

Natural montmorillonite from Mizusawa Industrial Chemicals, Ltd., Japan, was washed with deionized water and sieved to an average particle size of 0.28 mm. Acid-treated, lithium-exchanged montmorillonite (LiMMT) was prepared by stirring the natural montmorillonite in a 6 M $H_2SO_4$/1 M $Li_2SO_4$ solution at 100° C. for 6 h, followed by washing with deionized water and drying at 200° C. for 2 h. Prior to reaction with the organometallic complexes, LiMMT was partially dried at room temperature under vacuum overnight ($10^{-2}$ Torr) and stored under $N_2$. Triisobutylaluminum (TIBA)-modified clay was freshly prepared before each use, by the addition of either 0.29 or 0.96 g TIBA (1.0 M in hexanes) to 0.30 or 0.12 g LiMMT in 10.0 g toluene. The suspension was stirred for 5 minutes, the solution decanted, and the solid washed twice with 5.0 g dry toluene.

Clay-supported catalysts were prepared immediately prior to polymerization, under $N_2$ in a glovebox. In a typical experiment, a solution of the organometallic complex (8.0 mg, 0.010 mmol) in 5.0 g $CH_2Cl_2$ was added to a slurry of LiMMT (120 mg) in 5.0 g dry toluene at room temperature. The yellow color of the soluble organometallic complexes was almost completely transferred from the solution to the clay. After stirring for 5 minutes, the mixture was allowed to settle and the solution decanted. The solid was washed 5 times with dry toluene. For polymerization experiments, the solid was resuspended in toluene and loaded into the reactor inside the glovebox.

EXAMPLE 2

Homopolymerization

Ethylene homopolymerization and its copolymerization with methyl and ethyl acrylate were studied using Pd(II) and Ni(II) complexes based on a phosphinobenzenesulfonate ligand. The effect of supporting these complexes on acid-treated, Li-exchanged monmorillonite clay (LiMMT) was evaluated by comparing the polymerization activities of the homogeneous and heterogeneous catalysts, and by comparing the polymers produced.

In these studies, the catalysts were:

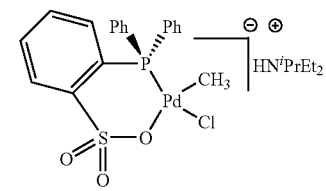
2a

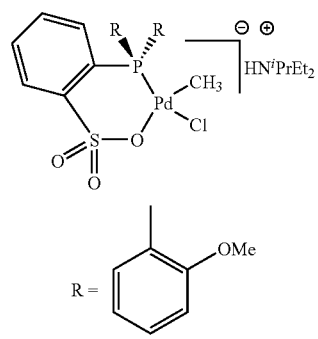
2b

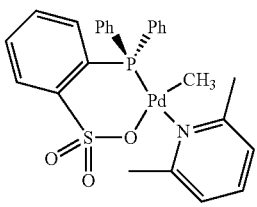
2c

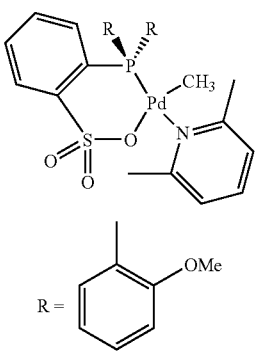
2d

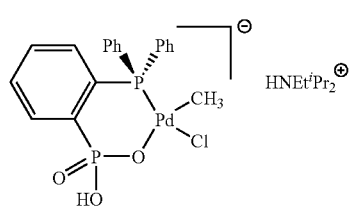
2e

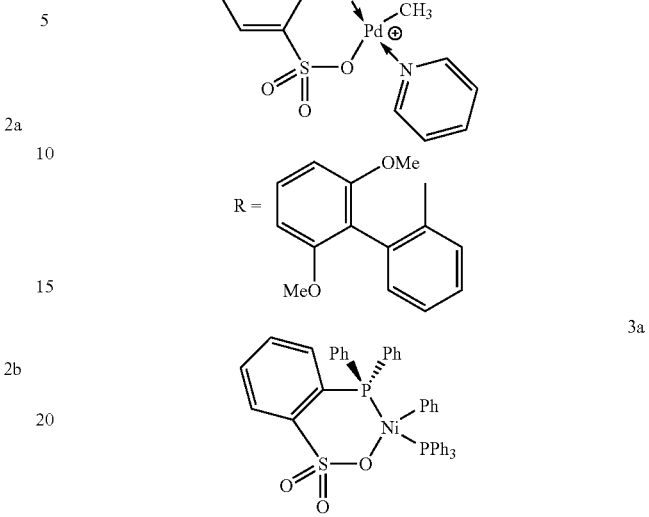
2f, 3a

Clay activation effect. The homogeneous catalysts 2a-d are active in ethylene homopolymerization at 90° C., however, the corresponding clay-supported 2a-b catalysts are significantly more active. After 1.5 h, the overall activity of the clay-supported catalysts is about double that of the homogeneous catalysts (FIG. 2, Table 1, entries 2 and 6). When the polymerization time is reduced to 10 minutes, the activities are five to six times higher (FIG. 2, Table 1, entries 4 and 8). This is also observed for clay-supported 2d; in this case, the activity is 4 times higher than the homogeneous catalyst (FIG. 2, Table 1, entries 15-16). The activating effect of the clay is thus most clearly demonstrated at short time reactions, promoting greater initial catalyst activity, although the results at longer times suggest that the clay also promotes faster catalyst deactivation. The molecular weight is higher for polyethylene produced by clay-supported 2a and 2d, but the polymer crystallinity is lower.

Clay pretreatment effects. The polymerization activity can be increased by varying the clay pretreatment. At least some of the hydroxyl groups on the clay surface are strongly Brønsted acidic, and may promote catalyst decomposition. In order to passivate the clay surface, an alkylaluminum (TIBA) was added to LiMMT prior to catalyst deposition. The activity of 2a supported on the treated clay is three times higher than unsupported 2a (FIG. 3, Table 2, entry 17). The molecular weight was also increased. Polymerization of ethylene employing untreated montmorillonite (MMT) as the catalyst support-activator gave an even higher activity than when TIBA-treated LIMMT was employed. The activity was further increased by increasing the clay loading (FIG. 3, Table 2). Melting points were higher with untreated clay, although molecular weights were similar to those obtained acid-treated LiMMT Lutidine effect. The anionic Pd chloride complexes 2a and 2b supported on LiMMT, MMT or LiMMT/TIBA show higher activities than their homogeneous analogues, possibly because the clay facilitates abstraction of the chloride ligand. When chloride is replaced by a more labile ligand, such as lutidine, abstraction should occur more readily and result in higher catalyst activity. Thus the homogeneous catalyst 2c shows 10-16 times higher activity than homogeneous 2a. The acceleration is greater at short reaction times (0.16 h), suggesting that the homogeneous lutidine complex is less stable under reaction conditions. Supporting 2c on LiMMT/TIBA results in lower overall activity after 1.5 h, but higher activity at the shorter reaction time (FIG. 4, Table 3, entry 21). Under these conditions, clay-activated 2c is 60% more active than unsupported 2c.

EXAMPLE 3

Copolymerization of Ethylene with Methyl and Ethyl Acrylate

The copolymerization of ethylene with methyl and ethyl acrylate was studied with homogeneous catalysts 2a-d as well as the corresponding clay-supported analogues. These copolymerizations were performed either in a 1 L autoclave (at MCRC) or in a 300 mL Parr bench top reactor (at UCSB).

Copolymerization activity with methyl acrylate. The clay-supported catalysts 2a-d all gave polymer after 1 h at 100° C., while the homogeneous complexes 2a and 2c are reported in the literature to be inactive.[22] The activities of homogeneous catalyst 2b and clay-supported 2b are similar (FIG. 5, Table 4, entries 22 and 23), while clay-supported 2d is less active than its homogeneous analogue (entries 24 and 25).

Clay-supported 2c is more active than any of clay-supported 2a, 2b or 2d. Its activity is comparable to that of the most active homogeneous catalyst 2d having o-methoxy substituents on the phenyl rings. Apparently, lutidine facilitates formation of the active site when unsubstituted phenyl groups are present, in contrast to the chloride-containing complexes, which are more active with o-methoxy substituents on the phenyl rings. The effect of clay treatment was also studied for 2b. When untreated MMT was employed, the activity was only slightly lower than with acid-treated LiMMT (FIG. 5, Table 4, entry 30).

Copolymerization activity with ethyl acrylate. Catalysts 2a-d and the clay-supported catalysts 2a-d all gave polymer after 1 h at 100° C. The activities of homogeneous catalysts 2a-d are higher than those of the clay-supported systems. The neutral complexes 2c and 2d are more active than the anionic complexes, with 2c being the most active, followed by 2d (FIG. 6, Table 5, entries 31-38). These complexes are more active towards ethyl acrylate than methyl acrylate.

Clay-supported 2c is more active than any of clay-supported 2a, 2b or 2d. This system gives the best activity (168 g mmol$^{-1}$ h$^{-1}$) and is also higher than that obtained with methyl acrylate (157 g mmol$^{-1}$ h$^{-1}$). 2a/LiMMT gives similar activity for both polar monomers. Although the clay-supported 2b and 2d systems were also active towards ethyl acrylate, their activities were lower when compared to those obtained with methyl acrylate.

Polymer Characterization. Both ethylene-methyl acrylate and ethylene-ethyl acrylate copolymers were analyzed by IR, DSC, GPC, $^1$H and $^{13}$C NMR spectroscopy. IR spectra of all copolymers obtained with catalysts 2a-d and their clay-supported analogues show the characteristic v(C=O) peak for methyl acrylate subunits at 1745 cm$^{-1}$ and for ethyl acrylate subunits at 1745 cm$^{-1}$, as well as peaks at 1480 and 690 cm$^{-1}$ corresponding to vibrations of the ethylene subunits, FIGS. 7A, 7B, 8A and 8B.

Figure 9:
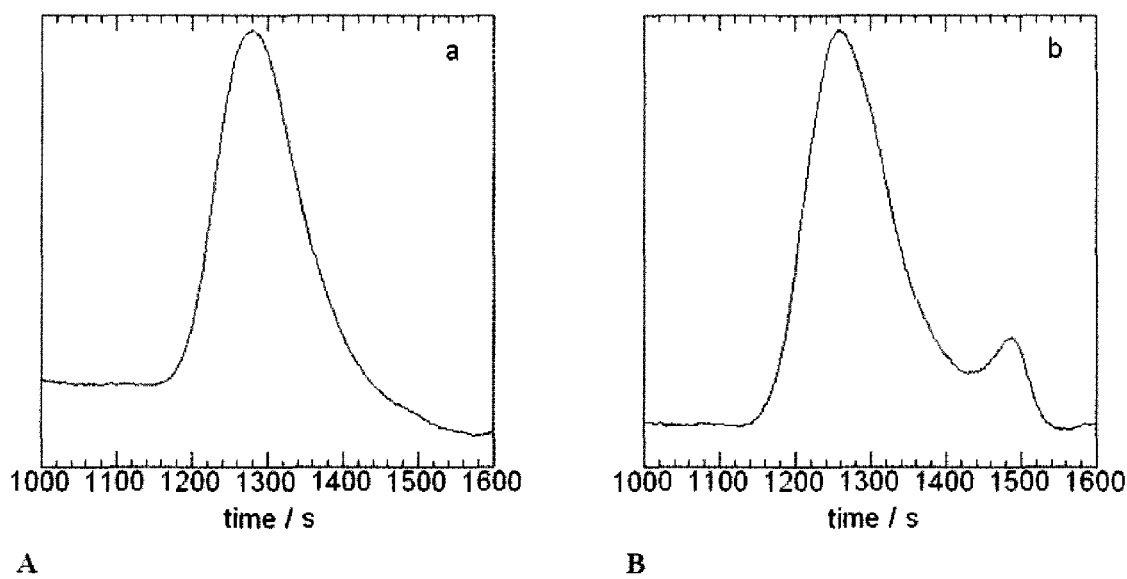
FIG. 9 is a comparison of GPC's for ethylene-methyl acrylate copolymers produced by clay-supported 2c (9A), and clay-supported 2d (9B), both prepared in 1 h at 100° C.

The ethylene-methyl acrylate copolymers obtained with clay-supported 2a and 2c have weight-average molecular weights ($M_w$) of 11 900 and 10 100, respectively. Increased molecular weights were observed for copolymers made with clay-supported catalysts 2b (15 700) and 2d (15 500) containing ortho-methoxy substituents, as well as for 2b supported on untreated clay (15 900). However, clay-supported 2b and 2d catalysts also produce oligomers, which is not observed for clay-supported catalysts 2a and 2c with unsubstituted phenyl groups (FIGS. 9A, 9B, and 10).

The ethylene-ethyl acrylate copolymers obtained with clay-supported 2a, 2c and 2d have similar weight-average molecular weights ($M_w$) of 10 000, however, very low molecular weight was observed for clay-supported 2b. The polymer crystallinity decreased for clay-supported 2a-d systems, with the lowest crystallinity for clay-supported 2b, followed by clay-supported 2a (FIG. 11).

The incorporation of methyl and ethyl acrylate into polyethylene was further studied by $^1$H and $^{13}$C NMR spectroscopy. $^1$H and $^{13}$C NMR spectra were recorded on either Varian or Bruker spectrometers operating at 500 MHz ($^1$H frequency), $^{13}$C (126 MHz). NMR measurements were carried out at 90° C. using 1,2,4-trichlorobenzene/$C_6D_6$ (2:1) as the solvent. The concentration of all samples was approximately 200 mg copolymer/mL.

Figure 12:
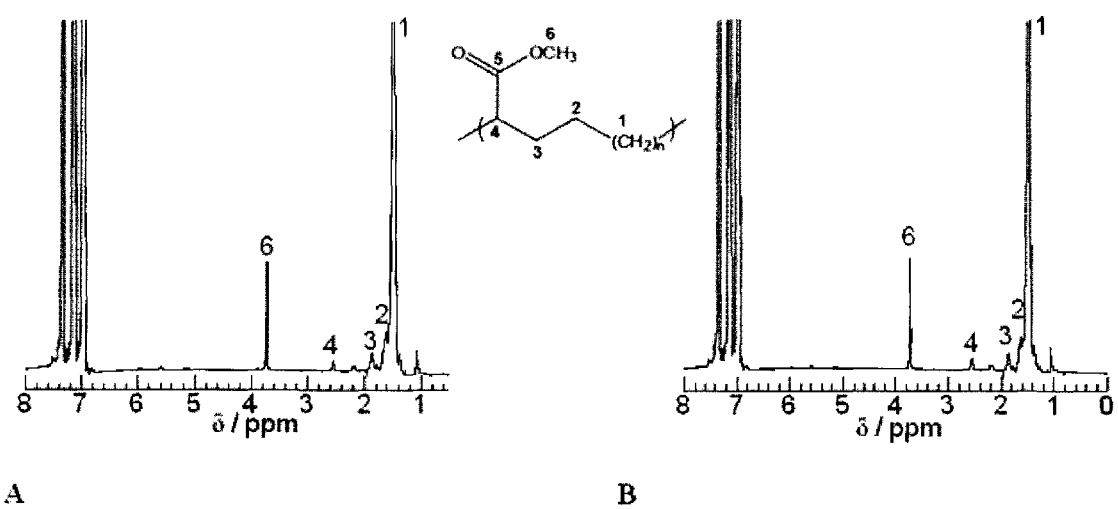
FIG. 12 is a comparison of $^1$H NMR spectra for ethylene-methyl acrylate copolymers produced by homogeneous 2d (12A); and clay-supported 2d (12B)
Figure 15:
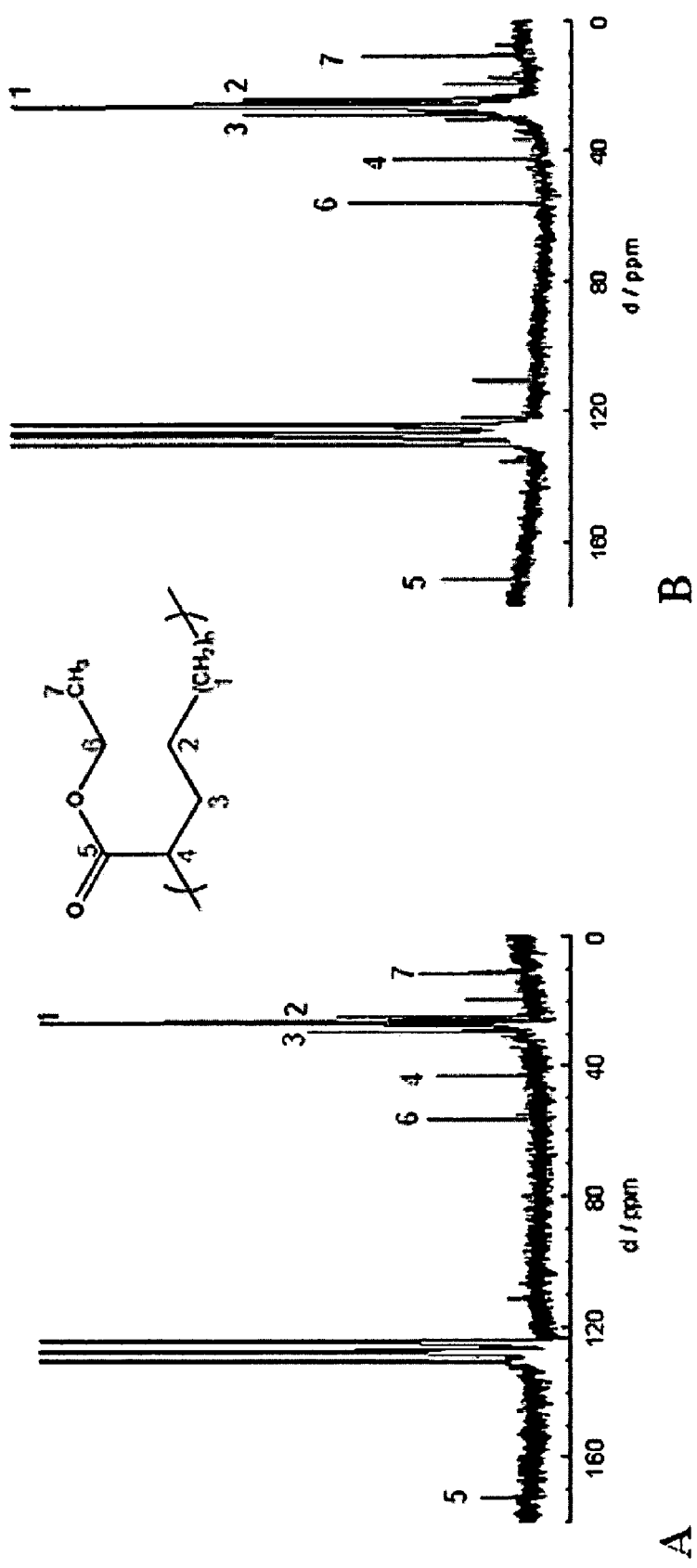
FIG. 15 is a comparison of $^{13}$C NMR spectra of ethylene-ethyl acrylate copolymers produced by homogeneous catalyst 2c (15A); and clay-supported 2c (115B)

For the ethylene-methyl acrylate copolymers obtained with homogeneous catalysts 2b and 2d, signals corresponding to the functional groups of the comonomer were present, in addition to the signals for polyethylene. The $^1$H NMR spectrum of the copolymer obtained with the homogeneous 2d is depicted in FIGS. 12A and 12B. In addition to the resonances of polyethylene at δ 3.20 ppm, resonances at δ 3.61 and 2.28 ppm can be assigned to the methoxy and methylene protons, respectively, of methyl acrylate (MA) units. The resonances at δ 176.8, 51.0 and 45.7 ppm in the $^{13}$C NMR spectrum, FIGS. 13A and 13B, confirm the presence of MA units. There is no splitting of the signal arising from the $\overline{C=O}$ group in the copolymer, indicating that MA units are statistically incorporated into the copolymer chain backbone as reported by Drent et al.[9] The incorporation of methyl acrylate (6 mol %) was calculated based on the $^1$H NMR spectrum, by integrating the signals for the methoxy groups at δ 3.61 ppm and the methylene groups at δ1.22 ppm. Similar spectra were recorded for copolymers made with the clay-supported catalysts; the presence of clay does not influence the incorporation ratio.

In a similar way, the ethylene-ethyl acrylate copolymers were analyzed. The resonances at δ 171.5, 55.2 and 45.3 ppm in the $^{13}$C NMR spectrum confirm the presence of EA units. The incorporation of methyl acrylate (~4-6 mol %) was calculated based on the $^1$H NMR spectrum, by integrating the signals for the methylene protons next to the carbonyl group at δ 3.68 ppm and the methylene groups at δ 1.48 ppm (FIGS. 14A, 14B, 15A and 15B). The highest incorporation (~6 mol %) was observed for 2b-d and clay-supported 2c, followed by 2a and clay-supported 2a-b and 2d systems with 4 mol %.

EXAMPLE 4

Copolymerization Activity of Nickel Complex

Copolymerizations were carried out at 100° C. for 1 h under ethylene pressure (430 psi). Under these conditions, the homogeneous complex 3c was inactive, whereas the corresponding clay-supported catalyst was active. The activity of clay-supported 3a is low (24 g mmol$^{-1}$ h$^{-1}$) compared to those of the clay-supported Pd catalysts. However, this is the first report of activity for this type of Ni complex. At longer reaction times, the activity is improved as well as the polymer yield. The polymer crystallinity is slightly affected and a molecular weight similar to those produced with the Pd systems is observed (FIG. 16, Table 8, entry 41).

Figures 16, 17:
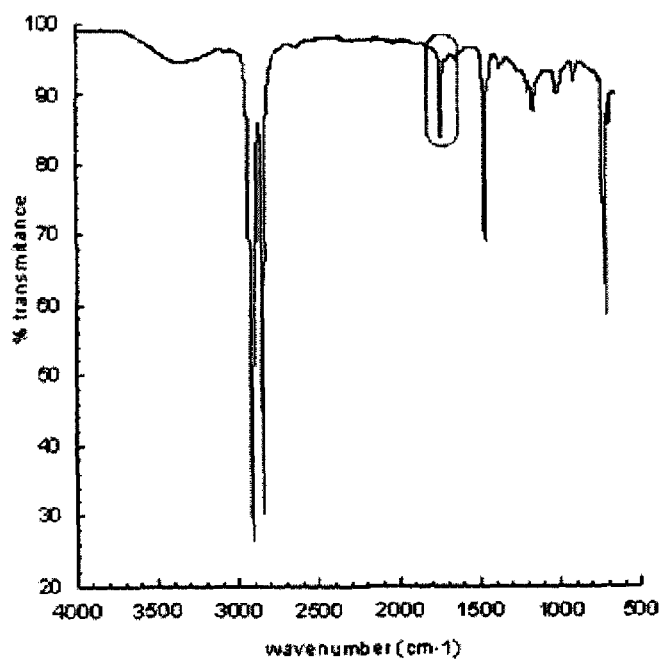

IR characterization of the copolymer confirms the presence of methyl acrylate. The IR shows the characteristic v(C=O)

peak for methyl acrylate subunits at 1745 cm$^{-1}$, as well as peaks at 1480 and 690 cm$^{-1}$ corresponding to vibrations of the ethylene subunits, FIG. 17.

The incorporation of methyl acrylate into polyethylene was determined by $^1$H and $^{13}$C NMR spectroscopy. For the copolymer obtained with 3a/LiMMT/TIBA, signals corresponding to the functional groups of the comonomer were present, in addition to the signals for polyethylene. The $^1$H NMR spectrum of the copolymer obtained with 3a/LiMMT/TIBA is depicted in FIG. 18. In addition to the resonances of polyethylene at δ 1.50 ppm, resonances at δ 3.68 and 2.60 ppm can be assigned to the methoxy and methylene protons, respectively, of methyl acrylate units. The resonances at δ 175.8, 49.7 and 44.7 ppm in the $^{13}$C NMR spectrum confirm the presence of MA units (FIG. 18). There is no splitting of the signal arising from the C=O group in the copolymer, indicating that MA units are statistically incorporated into the copolymer chain backbone as previously described for the copolymers obtained with Pd catalysts. The incorporation of methyl acrylate (4 mol %) was calculated based on the $^1$H NMR spectrum, by integrating the signals for the methoxy groups at δ 3.68 ppm and the methylene groups at δ 1.50 ppm.

EXAMPLE 5

NMR Characterization of Clay-Catalyst Interactions

The clay-supported 2a-d systems are active in the homopolymerization of ethylene as well as in copolymerization with methyl and ethyl acrylate. These results show that the clay influences catalyst behavior, therefore it is of interest to understand how these complexes interact with the clay, i.e., the mode of anchoring and the mechanism of activation of the intact or rearranged complex.

Preliminary investigations were conducted by $^{31}$P MAS NMR spectroscopy. The clay-supported complexes 2a-d were prepared in the glovebox (under N$_2$) by adding a solution of 2a-d (16 mg, 0.020 mmol) in toluene to a slurry of the clay (240 mg) in 5 g dry toluene at room temperature. The initial yellow color of the soluble palladium complex was completely transferred from the solution to the clay. After stirring for 5 minutes, the mixture was allowed to settle and the solution was decanted. The solid was washed 5 times with dry toluene and dried under vacuum. Samples were packed into 4 mm zirconia rotors in a nitrogen-filled glovebox. 31P MAS NMR spectra were acquired on a Bruker Avance NMR spectrometer ($^1$H frequency: 300 MHz; $^{31}$P frequency: 121.440 MHz), at spinning rates of 10 kHz at room temperature. The chemical shifts were referenced to H$_3$PO$_4$.

Figure 19:
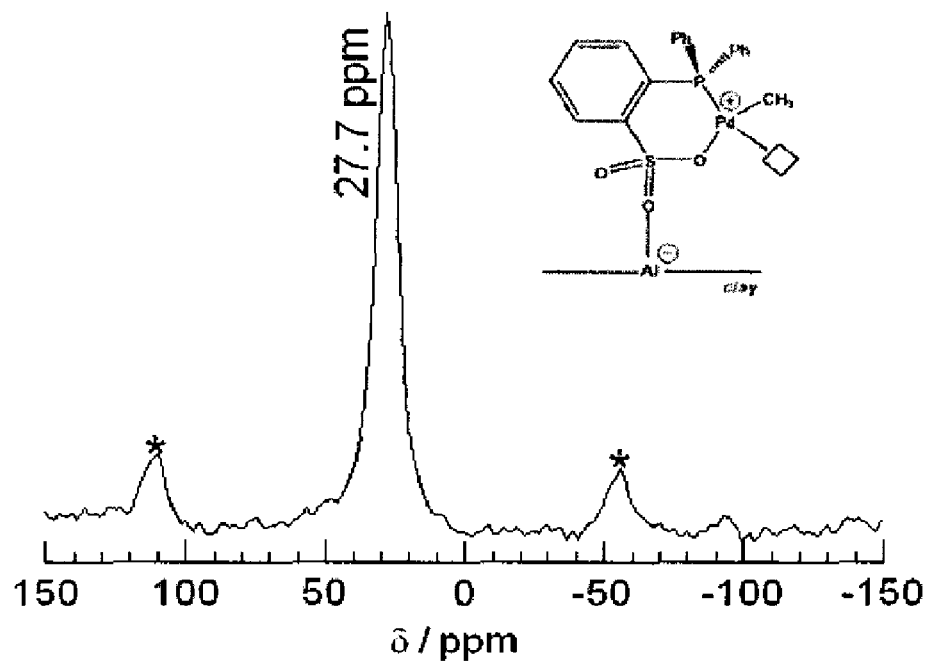
FIG. 19 is a $^{31}$P MAS NMR spectrum of clay-supported complex 2a, where "*" indicates a spinning side-band.

The spectrum of clay-supported complex 2a consists of one isotropic peak at δ=27.7 ppm (FIG. 19). For comparison, the $^{31}$P NMR spectrum of the pure complex in solution (CDCl$_3$) shows only one singlet at δ=27.60 ppm. Since these chemical shifts are very similar, the structure of complex 2a likely remains intact upon clay activation. No changes in the 31P MAS NMR spectrum were observed at higher clay loadings (500 mg) or at high temperatures. This suggests that even at elevated temperatures, the structure of the adsorbed catalyst is maintained in the absence of ethylene.

Figure 20:
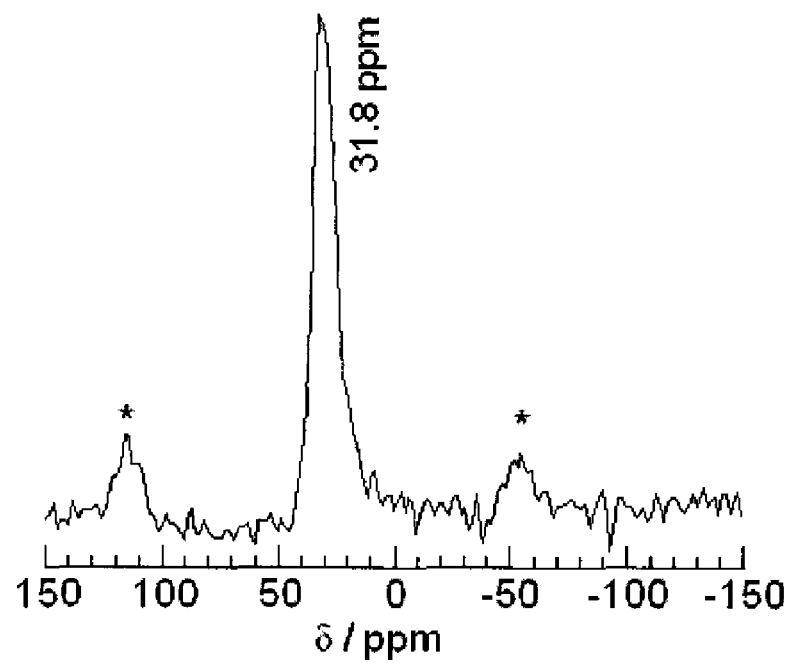
FIG. 20 is a $^{31}$P MAS NMR spectrum of complex 2c supported on LiMMT, spin rate 10 kHz, where * indicates a spinning side-band.

Similar experiments were carried out with clay-supported 2c. The $^{31}$P NMR spectrum of the pure complex in solution (CDCl$_3$) shows only one singlet, at δ=24.60 ppm. The spectrum of 2c on LiMMT (120 mg) consists of one isotropic peak, at δ=31.8 ppm (FIG. 20). The downfield change in chemical shift suggests abstraction of the lutidine ligand by the clay, without affecting the rest of the complex.

Catalyst systems based on the phosphinophosphonate Pd complex 2e may prove more useful in characterizing clay-catalyst interactions, since there can be a direct link between the phosphonate group and the clay surface. The synthesis of the ligand was carried out following the synthetic procedure reported by Rieger et al. (38) and the Pd complex was prepared following a procedure similar to that reported by Nozaki et al. (22). The clay-supported 2e system was prepared following the procedure described for the clay-supported 2a-d.

Figure 21:
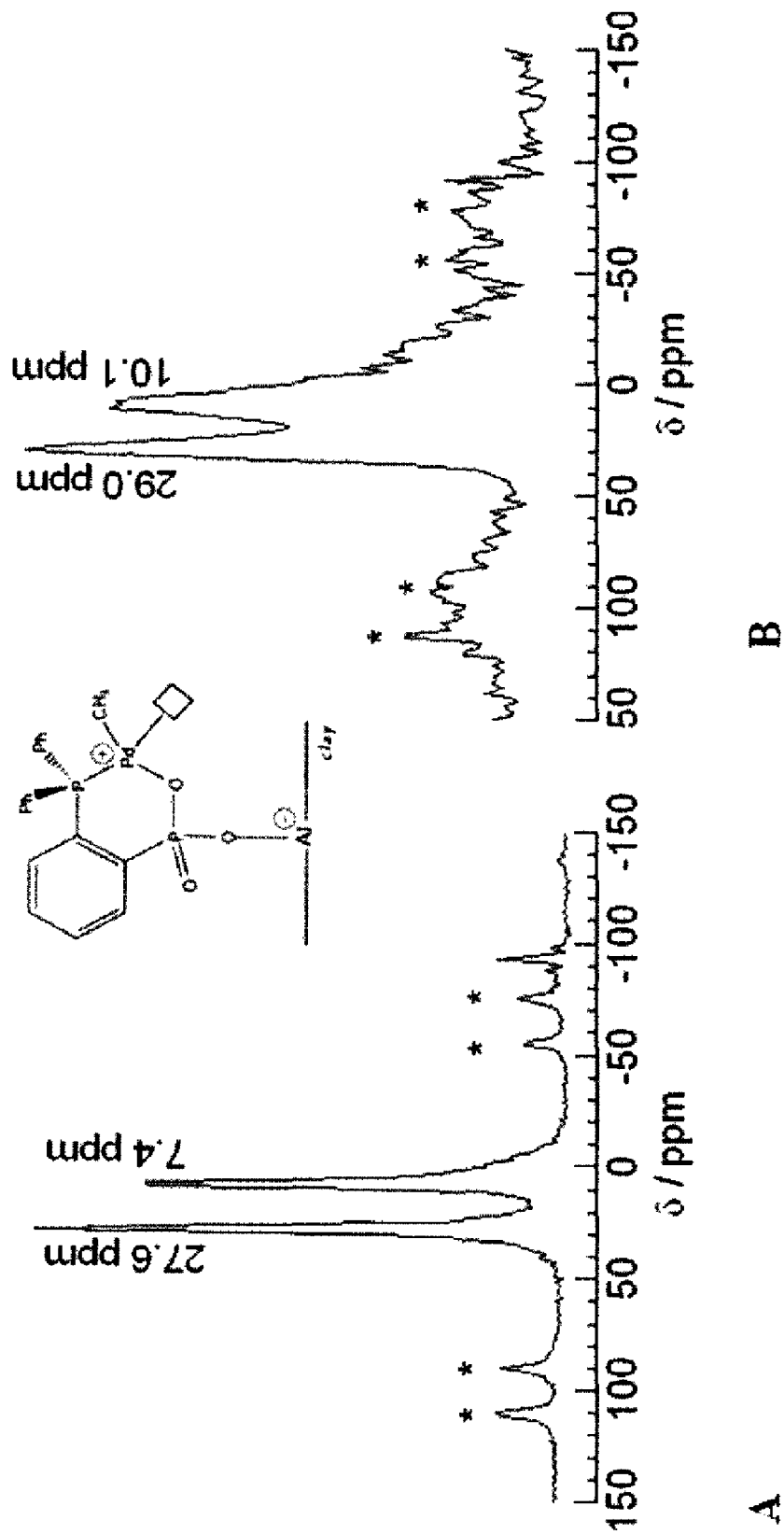
FIG. 21 provides $^{31}$P MAS NMR spectra of the molecular complex 2e (21A) and complex 2c (21B) supported on LiMMT, spin rate 10 kHz, where "*" indicates a spinning side-band.

The $^{31}$P MAS NMR spectrum of 2e contains two sharp peaks, FIG. 21A. The signal at 27.6 ppm corresponds to PPh$_2$, directly coordinated to Pd. The signal at 7.4 ppm corresponds to the phosphonate, coordinated to Pd through oxygen. When 2e is supported on acid-treated clay, two signals are also observed in the $^{31}$P MAS NMR spectrum, FIG. 21B. Both are shifted downfield relative to the spectrum of the homogeneous complex. The signal for the PPh$_2$ signal appears at 29.0 ppm, while the signal for the phosphonate appears at 10.1 ppm. Although the structure of the complex appears to be retained, binding of the phosphonate ligand to the clay surface causes deshielding of both phosphorus atoms, consistent with the formation of a Zwitterionic surface complex.

These NMR studies indicate that the structures of the Pd complexes remain intact upon adsorption. Abstraction of the chloride or lutidine ligand by the clay can occur without affecting the rest of the complex.

EXAMPLE 6

Polymerization Methods

Ethylene Polymerization procedure. In a typical procedure, the clay-supported palladium complexes 2a-d were prepared in a glovebox (under N$_2$) by adding solutions of 2a-d (8 mg, 0.01 mmol) in toluene (5 mL) to a slurry of the clay (LiMMT, acid-treated montmorillonite, 120 mg, supplied by MCRC, except as noted) in 10 g dry toluene at room temperature. The initial yellow color of the soluble palladium complex was completely transferred to the clay. This slurry was filtered and washed three times with dry toluene before being loaded directly into a 300 mL Parr bench top reactor. After addition of 40 g toluene, the reactor was sealed and removed from the glove box. The reactor was then charged with 100 psi ethylene at 90° C. with ethylene fed continuously for the prescribed time. A similar procedure was used for the homogeneous polymerization experiments, but the clay was omitted and the solutions of catalysts 2a-c were charged directly to the reactor.

Copolymerization procedure using 1 L reactor. Copolymerization employing the homogeneous catalysts 2b and 2d was carried out in a 1 L autoclave. Addition of toluene (480 mL), followed by the polar monomer (methyl acrylate, 12 mL), was performed under N$_2$. The catalyst, 2b or 2d (0.10 g, 0.15 mmol) suspended in toluene (6 mL), was injected into the autoclave using ethylene pressure through a burst valve. A similar procedure was followed for the clay-supported palladium complexes 2a-d. The clay-supported catalysts were prepared by dissolving 0.10 g catalyst in 4 mL CH$_2$Cl$_2$. This catalyst solution was added to a suspension of 1.0 g LiMMT in 5 mL toluene. The resulting mixture was stirred for 1 h at room temperature before washing 3 times with dry toluene. Copolymerizations were conducted at 100° C. for 1 h. The polymer product was filtered, washed with acidified methanol and acetone and dried.

Copolymerization procedure using 300 mL reactor. Each of the clay-supported palladium complexes 2a-d was prepared in a glovebox (under N$_2$) by adding a solution of catalysts 2a-d (30 mg, 0.05 mmol) in toluene (5 mL) to a slurry of the clay (300 mg) in 10 g dry toluene at room temperature.

The yellow color of the soluble palladium complex was completely transferred to the clay. The mixture was stirred for 1 h, then the solvent was removed and the solid was washed 3 times with dry toluene. The clay-supported catalyst was suspended in toluene (4 mL) and transferred to a pressure valve adapted for the addition of the catalyst. One side had been sealed with aluminum foil. The catalyst addition device was then connected to the reactor through the pressure valve. The comonomer, methyl acrylate (3.7 mL), was poured into the glass insert of a 300 mL Parr bench top reactor. After addition of 100 g toluene, the reactor was sealed and removed from the glove box. The catalyst was injected into the autoclave at 95° C. and 200 psi ethylene. The reactor was then charged with 430 psi ethylene at 100° C. with ethylene fed continuously for the prescribed time. The polymer so obtained was stirred with acidified methanol for 1 h. The solid was filtered and washed 5 times with acidified methanol to remove any homopolymer of methyl acrylate that might have formed.

Results a. Pd-Catalyzed Ethylene Homopolymerization

The homogeneous Pd complexes 2a-d are active in ethylene polymerization, with the highest activity, 933 g mmol$^{-1}$ h$^{-1}$ recorded for 2d. When supported on acid-treated montmorillonite clay, the homopolymerization activity of each complex is significantly higher, for example, 812 g mmol$^{-1}$ h$^{-1}$ for 2c/LiMMT-TIBA.

The homopolymerization activity increases with clay loading. The activity of 2a supported on LiMMT treated with TIBA is three times higher than that of homogeneous 2a (93 vs. 31 g mmol$^{-1}$ h$^{-1}$). The crystallinity and molecular weight of the polyethylene are higher in the materials made by the supported catalysts.

Untreated montmorillonite is a more effective catalyst support-activator than acid-treated montmorillonite.

Catalysts in which the chloride ligand is replaced by lutidine are more active for ethylene homopolymerization. Thus homogeneous activity increases by a factor of 16 from anionic 2a to the neutral 2c (35 vs. 562 g mmol$^{-1}$ h$^{-1}$, respectively). When the neutral complex 2c is supported on LiMMT/TIBA, an even higher activity is observed (812 g mmol$^{-1}$ h$^{-1}$).

b. Pd Complexes in Copolymerization of Ethylene with Methyl Acrylate

Pd complexes 2a-d are active in the copolymerization of ethylene with methyl acrylate when montmorillonite clay is used as the catalyst support-activator. The homogeneous complex 2a has been reported to have very low activity, and no activity has been reported for homogeneous 2c. Clay-supported 2d shows lower activity than its homogeneous analogue (57 vs. 243 g mmol$^{-1}$ h$^{-1}$), while the activity of 2b remains essentially unchanged when montmorillonite clay is employed (108 vs. 97 g mmol$^{-1}$ h$^{-1}$). These clay-supported 2a-d systems can also incorporate other polar monomers such as ethyl acrylate. Clay-supported 2c were found to be the most active catalyst formulation, with an activity of 147 g mmol$^{-1}$ h$^{-1}$ for methyl acrylate and 168 g mmol$^{-1}$ h$^{-1}$ for ethyl acrylate. Incorporation of the polar monomer was confirmed by IR, $^1$H and $^{13}$C NMR spectroscopy; typical incorporation ratios of 6 mol % are achieved.

c. Ni Complexes in Copolymerization of Ethylene with Polar Monomers

Ni complex 3a supported on montmorillonite clay is active in the copolymerization of ethylene with methyl acrylate (4.80 g mmol$^{-1}$ h$^{-1}$), while the homogeneous complex 3a is not active. Incorporation of the polar monomer was demonstrated by IR, $^1$H and $^{13}$C NMR spectroscopy; incorporation ratios of 4 mol % are achieved.

d. Clay-Catalyst Interactions $^{31}$P MAS NMR spectroscopy provides information about the way the metal complex interact with the clay. These studies indicate that the structures of the Pd complexes remain intact upon adsorption. Abstraction of the chloride or lutidine ligand by the clay can occur without affecting the rest of the complex.

EXAMPLE 7

Ethylene homopolymerization. In a N$_2$-filled glove box, a light yellow solution of the air-sensitive catalyst, LPd(Me)(NC$_5$H$_5$), 2f, where L=2-[bis(2,'6'-dimethoxy-biphenyl-2-yl)phosphanyl]benzenesulfonic acid (8.0 mg in 5.0 g toluene) was mixed with a slurry of 120 mg LiMMT suspended in 5 g toluene for 5 minutes at room temperature. The mixture was allowed to settle and the solution decanted. The solid was washed 3 times with 5 mL toluene. The solid was resuspended in 80 mL toluene and loaded into a 300 mL batch polymerization reactor. The reactor was heated to 80° C. then pressurized with 100 psi C$_2$H$_4$. Polymerization was allowed to proceed for 10 minutes. The reaction yielded 1.1 g polyethylene, for an activity of 690 g PE (mmol Pd)$^{-1}$ h$^{-1}$.

Ethylene-methyl acrylate copolymerization. Toluene (100 mL) and methyl acrylate (3.8 mL) were added to a 300 mL Parr reactor under N$_2$. The clay-supported catalyst 2f (0.050 mmol on 300 mg LiMMT), suspended in toluene (10 mL), was injected into the autoclave using ethylene pressure through a burst valve. The catalyst was injected into the reactor at 95° C. and 200 psi ethylene. The ethylene pressure was then increased to 430 psi while the exothermic reaction caused the temperature to rise to 100° C., and ethylene was fed continuously for 10 minutes. Ethylene was vented and the reactor was allowed to cool to room temperature. The polymer was recovered from the reactor and stirred with methanol acidified with HCl for 1 h. The solid was filtered and washed 5 times with acidified methanol to remove traces of polar homopolymer that might have formed. After drying for 24 h, the reaction yielded 24.9 g polymer, for an activity of 2986 g PE (mmol Pd)$^{-1}$ h$^{-1}$. The IR spectrum of the copolymer shows a characteristic v(C—O) peak for methyl acrylate subunits at 1745 cm$^{-1}$, as well as peaks at approx. 2900, 1480 and 690 cm$^{-1}$ corresponding to vibrations of the ethylene subunits.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

REFERENCES

The following references are incorporated by reference herein.

1. L. S. Boffa, B. M. Novak, *Chem. Rev.* 2000, 100, 1479-1493.
2. J. Zhang, X. Wang, G. X. Jin, *Coord. Chem. Rev.* 2006, 250, 95-109.
3. H. G. Alt, A. Koppl, *Chem. Rev.* 2000, 100, 1205-1221.
4. L. K. Johnson, C. M. Killian, M. Brookhart, *J. Am. Chem. Soc.* 1995, 117, 6414-6415.
5. S. D. Ittel, L. K. Johnson, M. Brookhart, *Chem. Rev.* 2000, 100, 1169-1203.
6. L. K. Johnson, S. Mecking, M. Brookhart, *J. Am. Chem. Soc.* 1996, 118, 267-268.

7. S. Mecking, *Coord. Chem. Rev.* 2000, 203, 325-351.
8. S. Mecking, L. K. Johnson, L. Wang, M. Brookhart, *J. Am. Chem. Soc.* 1998, 120, 888-899.
9. E. Drent, R. van Dijk, R. van Ginkel, B. van Oort, R. I. Pugh, *Chem. Commun.* 2002, 744-745.
10. E. Drent, D. H. L. Pello, W. W. Jager, 1994, *Eur. Pat.* 589527 B1.
11. E. Drent, W. Sjardijn, J. C. L. S. Suykerbuyk, K. Wanninger, 2000, PCT Int. Appl. WO 00 106615.
12. A. Haras, G. D. W. Anderson, A. Michalak, B. Rieger, T. Ziegler, *Organometallics* 2006, 25, 4491-4497.
13. M. J. Szabo, N. M. Galea, A. Michalak, S. Y. Yang, L. F. Groux, W. E. Piers, T. Ziegler, *J. Am. Chem. Soc.* 2005, 127, 14692-14703.
14. S. Tomasi, H. Weiss, T. Ziegler, *Organometallics* 2006, 25, 3619-3630.
15. M. J. Szabo, R. F. Jordan, A. Michalak, W. E. Piers, T. Weiss, S. Y. Yang, T. Ziegler, *Organometallics* 2004, 23, 5565-5572.
16. N. T. Allen, B. L. Goodall, L. H. McIntosh, 2007, Eur. Pat. Appl. 1760086.
17. N. T. Allen, B. L. Goodall, L. H. McIntosh, 2007, Eur. Pat. Appl. 1760097.
18. N. T. Allen, B. L. Goodall, L. H. McIntosh, 2007, U.S. Pat. Appl. 049712.
19. T. C. Kirk, B. L. Goodall, L. H. McIntosh, 2007, Eur. Pat. Appl. 1762572.
20. L. H. McIntosh, N. T. Allen, T. C. Kirk, B. L. Goodall, 2007, Can. Pat. Appl. 2556356.
21. A. K. Hearley, R. A. J. Nowack, B. Rieger, *Organometallics* 2005, 24, 2755-2763.
22. T. Kochi, K. Yoshimura, K. Nozaki, *Dalton Trans.* 2006, 25-27.
23. D. K. Newsham, S. Borkar, A. Sen, D. M. Conner, B. L. Goodall, *Organometallics* 2007, 26, 3636-3638.
24. T. Kochi, A. Nakamura, H. Ida, K. Nozaki, *J. Am. Chem. Soc.* 2007, 129, 7770-7771.
25. K. M. Skupov, P. R. Marella, J. L. Hobbs, L. H. McIntosh, B. L. Goodall, J. P. Clayerie, *Macromolecules* 2006, 39, 4279-4281.
26. S. Liu, S. Borkar, D. Newsham, H. Yennawar, A. Sen, *Organometallics* 2007, 26, 210-216.
27. T. Kochi, S, Noda, K. Yoshimura, K. Nozaki, *J. Am. Chem. Soc.* 2007, 129, 8948-8949.
28. S. Luo, J. Vela, G. R. Lief, R. F. Jordan, *J. Am. Chem. Soc.* 2007, 129, 8946-8947.
29. W. Weng, Z. Shen, R. F. Jordan, *J. Am. Chem. Soc.* 2007, 129, 15450-15451.
30. J. Vela, G. R. Lief, Z. L. Shen, R. F. Jordan, *Organometallics* 2007, 26, 6624-6635.
31. J. A. v. Doom, R. L. Wife, 1994, EP296687B1.
32. W. Keim, F. H. Kowaldt, R. Goddard, C. Kruger, *Angew. Chem., Int. Ed. Engi.* 1978, 17, 466-467.
33. U. Klabunde, S. D. Ittel, *J. Mol. Catal.* 1987, 41, 123-134.
34. T. R. Younkin, E. F. Conner, J. I. Henderson, S. K. Friedrich, R. H. Grubbs, D. A. Bansleben, *Science* 2000, 287, 460-462.
35. C. Carlini, M. Martinelli, A. M. R. Galletti, G. Sbrana, *Macromol Chem. Phys.* 2002, 203, 1606-1613.
36. V. C. Gibson, A. Tomov, *Chem. Commun.* 2001, 1964-1965.
37. R. J. Nowack, A. K. Hearley, B. Rieger, *Z. Anorg. Allg. Chem.* 2005, 631, 2775-2781.
38. C. M. Reisinger, R. A. J. Nowack, D. Volkmer, B. Rieger, *Dalton Trans.* 2007, 272-278.
39. T. Schultz, A. Pfaltz, *Synthesis* 2005, 1005-1011.
40. E. Drent, R. van Dijk, R. van Ginked, B. van Oort, R. I. Pugh, *Chem. Commun.* 2002, 964-965.

What is claimed is:

1. A clay-supported complex comprising:
   a metal complex comprising a phosphinobenzenesulfonate ligand coordinated to Pd(II) or Ni(II); and
   a clay combined with said metal complex.

2. The clay-supported complex of claim 1, wherein the phosphinobenzenesulfonate ligand is coordinated to Pd(II).

3. The clay-supported complex of claim 1, wherein the phosphinobenzenesulfonate ligand is coordinated to Ni(II).

4. The clay-supported complex of claim 1, wherein the metal complex is formed by combining the clay with a metal compound of the formula (I) or (II):

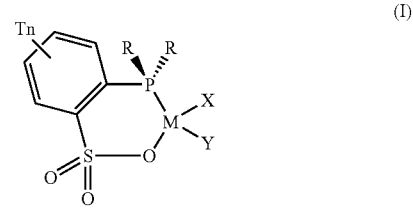

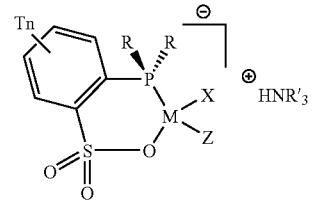

wherein:

M is Pd or Ni;

each T of $T_n$, independently, is a hydrogen atom, a halogen atom, or a hydrocarbyl group having 1 to 30 carbon atoms, wherein the hydrocarbyl group may contain one or more silicon atoms, each T may be a ring, and n=0-4;

X is a hydrogen atom, a halogen atom, or a hydrocarbyl group having 1 to 30 carbon atoms, wherein the hydrocarbyl group may contain one or more silicon atoms, and wherein X may be a ring;

each R, independently, is a hydrogen atom, a halogen atom, a hydrocarbyl group having 1 to 30 carbon atoms, or an aryl group substituted with one or more functional groups and having 1 to 30 carbon atoms;

Y is a compound having 1 to 20 carbon atoms and containing one or more oxygen, nitrogen, phosphorus and/or sulfur atoms that coordinate to M;

Z is a hydrogen atom, a hydrocarbyl group having 1 to 20 carbon atoms, a halogen atom, or a trifluoromethanesulfonyl group; and each R', independently, is a hydrocarbyl group having 1 to 20 carbon atoms, an alkoxy group having 1 to 20 carbon atoms, or an aryloxy group having 1 to 20 carbon atoms, and may contain one or more oxygen atoms.

5. The clay-supported complex of claim 4, wherein each R, independently, is a phenyl group having the formula (III):

(III)

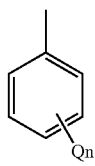

wherein each Q of Qn, independently, is a hydrogen atom, a halogen atom, a hydrocarbyl group having 1 to 24 carbon atoms, an alkoxy group having 1 to 24 carbon atoms, an aryloxy group having 1 to 24 carbon atoms, or a substituted aryl group having 1 to 24 carbon atoms, wherein the hydrocarbyl, alkoxy, aryloxy or substituted aryl group may contain one or more silicon atoms or alkoxy groups, or a combination thereof, and wherein n=0-5.

6. The clay-supported complex of claim 1, wherein the clay is a clay mineral or an ion exchange layered silicate.

7. The clay-supported complex of claim 6, wherein the silicate is selected from the group consisting of montmorillonite, beidellite, nontronite, saponite, hectorite, stevensite, vermiculite, mica, illite, sericite, glauconite, attapulgite, sepiolite, taeniolite, palygorskite, bentonite, pyrophyllite, talc, a chlorite, and kaolinite.

8. A clay-supported complex comprising:
a metal complex comprising phosphinobenzenephosphonate ligand coordinated to Pd(II) or Ni(II); and
a clay combined with said metal complex.

9. A method of polymerization or copolymerization, comprising polymerizing at least one monomer in the presence of the clay-supported complex of claim 8.

10. A method for homopolymerization, comprising polymerizing an olefin monomer in the presence of a clay-supported catalyst complex, said complex comprising:
a metal complex comprising a phosphinobenzenesulfonate ligand coordinated to Pd(II) or Ni(II); and
a clay combined with said metal complex.

11. The method of claim 10, wherein the phosphinobenzenesulfonate ligand is coordinated to Pd(II).

12. The method of claim 10, wherein the phosphinobenzenesulfonate ligand is coordinated to Ni(II).

13. The method of claim 10, wherein the metal complex is formed by combining the clay with a metal compound of the following formula (I) or (II):

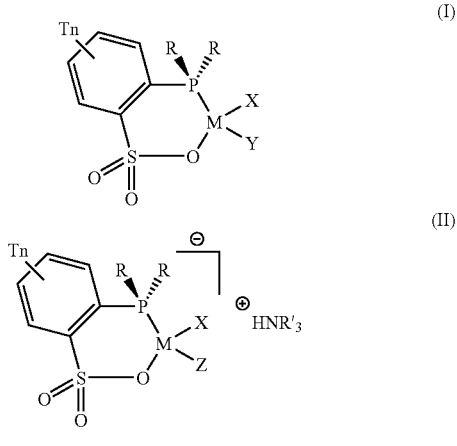

wherein:
M is Pd or Ni;
each T of $T_n$, independently, is a hydrogen atom, a halogen atom, or a hydrocarbyl group having 1 to 30 carbon atoms, wherein the hydrocarbyl group may contain one or more silicon atoms, each T may be a ring, and n=0-4;
X is a hydrogen atom, a halogen atom, or a hydrocarbyl group having 1 to 30 carbon atoms, wherein the hydrocarbyl group may contain one or more silicon atoms, and wherein X may be a ring;
each R, independently, is a hydrogen atom, a halogen atom, a hydrocarbyl group having 1 to 30 carbon atoms, or an aryl group substituted with one or more functional groups and having 1 to 30 carbon atoms;
Y is a compound having 1 to 20 carbon atoms and containing one or more oxygen, nitrogen, phosphorus and/or sulfur atoms that coordinate to M;
Z is a hydrogen atom, a hydrocarbyl group having 1 to 20 carbon atoms, a halogen atom, or a trifluoromethanesulfonyl group; and
each R', independently, is a hydrocarbyl group having 1 to 20 carbon atoms, an alkoxy group having 1 to 20 carbon atoms, or an aryloxy group having 1 to 20 carbon atoms, and may contain one or more oxygen atoms.

14. The method of claim 13, wherein each R, independently, is a phenyl group having the formula (III):

(III)

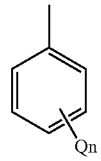

wherein each Q of Qn, independently, is a hydrogen atom, a halogen atom, a hydrocarbyl group having 1 to 24 carbon atoms, an alkoxy group having 1 to 24 carbon atoms, an aryloxy group having 1 to 24 carbon atoms, or a substituted aryl group having 1 to 24 carbon atoms, wherein the hydrocarbyl, alkoxy, aryloxy or substituted aryl group may contain one or more silicon atoms or alkoxy groups, or a combination thereof, and wherein n=0-5.

15. The method of claim 10, wherein the clay is a clay mineral or an ion exchange layered silicate.

16. The method of claim 15, wherein the silicate is selected from the group consisting of montmorillonite, beidellite, nontronite, saponite, hectorite, stevensite, vermiculite, mica, illite, sericite, glauconite, attapulgite, sepiolite, taeniolite, palygorskite, bentonite, pyrophyllite, talc, a chlorite, and kaolinite.

17. The method of claim 10, wherein the monomer is: an olefin of the formula $R^1CH=CH_2$, wherein $R^1$ is hydrogen or a linear, branched or cyclic alkyl group having 1 to 30 carbon atoms; styrene; functionalized styrene; norbornene; or functionalized norbornene.

18. A composite produced by the process of claim 10, comprising the clay-supported complex and the hompolymerization product of claim 10.

19. A method for copolymerization, comprising polymerizing two or more different monomers in the presence of a clay-supported catalyst complex, said complex comprising:
a metal complex comprising a phosphinobenzenesulfonate ligand coordinated to Pd(II) or Ni(II); and
a clay combined with said metal complex.

20. The method of claim 19, wherein the phosphinobenzenesulfonate ligand is coordinated to Pd(II).

21. The method of claim 19, wherein the phosphinobenzenesulfonate ligand is coordinated to Ni(II).

22. The method of claim 19, wherein the metal complex is formed by combining the clay with a metal compound of the following formula (I) or (II):

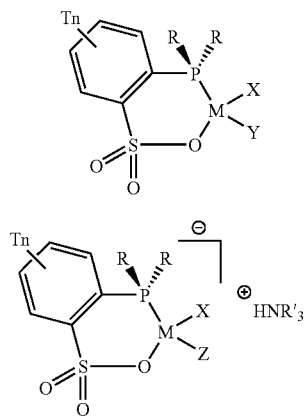

wherein:

M is Pd or Ni;

each T of $T_n$, independently, is a hydrogen atom, a halogen atom, or a hydrocarbyl group having 1 to 30 carbon atoms, wherein the hydrocarbyl group may contain one or more silicon atoms, each T may be a ring, and n=0-4;

X is a hydrogen atom, a halogen atom, or a hydrocarbyl group having 1 to 30 carbon atoms, wherein the hydrocarbyl group may contain one or more silicon atoms, and wherein X may be a ring;

each R, independently, is a hydrogen atom, a halogen atom, a hydrocarbyl group having 1 to 30 carbon atoms, or an aryl group substituted with one or more functional groups and having 1 to 30 carbon atoms;

Y is a compound having 1 to 20 carbon atoms and containing one or more oxygen, nitrogen, phosphorus and/or sulfur atoms that coordinate to M;

Z is a hydrogen atom, a hydrocarbyl group having 1 to 20 carbon atoms, a halogen atom, or a trifluoromethanesulfonyl group; and each R', independently, is a hydrocarbyl group having 1 to 20 carbon atoms, an alkoxy group having 1 to 20 carbon atoms, or an aryloxy group having 1 to 20 carbon atoms, and may contain one or more oxygen atoms.

23. The method of claim 22, wherein each R, independently, is a phenyl group having the formula (III):

wherein each Q of Qn, independently, is a hydrogen atom, a halogen atom, a hydrocarbyl group having 1 to 24 carbon atoms, an alkoxy group having 1 to 24 carbon atoms, an aryloxy group having 1 to 24 carbon atoms, or a substituted aryl group having 1 to 24 carbon atoms, wherein the hydrocarbyl, alkoxy, aryloxy or substituted aryl group may contain one or more silicon atoms or alkoxy groups, or a combination thereof, and wherein n=0-5.

24. The method of claim 19, wherein the clay is a clay mineral or an ion exchange layered silicate.

25. The method of claim 24, wherein the silicate is selected from the group consisting of montmorillonite, beidellite, nontronite, saponite, hectorite, stevensite, vermiculite, mica, illite, sericite, glauconite, attapulgite, sepiolite, taeniolite, palygorskite, bentonite, pyrophyllite, talc, a chloritp, and kaolinite.

26. The method of claim 19, wherein the two or more different monomers are each independently: an olefin of the formula $R^2CH=CH_2$, wherein $R^2$ is either hydrogen or a linear, branched or cyclic alkyl group having 1 to 30 carbon atoms; styrene; functionalized styrene, norbornene; functionalized norbornene; or a polar monomer of the formula $H_2C=CR^3X$, wherein $R^3$ is hydrogen or an alkyl, aryl, or alkoxy group having 1 to 30 carbon atoms, and X is a polar group.

27. A composite produced by the process of claim 19, comprising the clay-supported complex and the copolymerization product of claim 19.

* * * * *